US011116031B2

(12) United States Patent
Mildh et al.

(10) Patent No.: US 11,116,031 B2
(45) Date of Patent: *Sep. 7, 2021

(54) HANDLING OF INACTIVE PARAMETERS UPON RELEASE AND RE-SUSPEND

(71) Applicant: TELEFONAKTIEBOLAGET LM ERICSSON (PUBL), Stockholm (SE)

(72) Inventors: Gunnar Mildh, Sollentuna (SE); Icaro L. J. da Silva, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 38 days.

This patent is subject to a terminal disclaimer.

(21) Appl. No.: 16/657,296

(22) Filed: Oct. 18, 2019

(65) Prior Publication Data

US 2020/0053823 A1 Feb. 13, 2020

Related U.S. Application Data

(63) Continuation of application No. 16/386,148, filed on Apr. 16, 2019, now Pat. No. 10,485,051.
(Continued)

(51) Int. Cl.
*H04W 76/27* (2018.01)
*H04W 76/30* (2018.01)
*H04W 68/00* (2009.01)
*H04W 76/11* (2018.01)
*H04W 76/19* (2018.01)

(52) U.S. Cl.
CPC ......... *H04W 76/27* (2018.02); *H04W 68/005* (2013.01); *H04W 76/11* (2018.02); *H04W 76/19* (2018.02); *H04W 76/30* (2018.02)

(58) Field of Classification Search
CPC ... H04W 76/27; H04W 76/30; H04W 68/005; H04W 76/11; H04W 76/19
See application file for complete search history.

(56) References Cited

U.S. PATENT DOCUMENTS

2014/0226568 A1* 8/2014 Jeong ................ H04W 36/0022
370/328
2015/0092688 A1 4/2015 Jeong et al.
(Continued)

FOREIGN PATENT DOCUMENTS

EP 3073649 A1 9/2016

OTHER PUBLICATIONS

OPPO, "Left issues for Inactive security framework", 3GPP TSG-RAN2#101bis, R2-1804551, Apr. 16-20, 2018.
(Continued)

*Primary Examiner* — Kiet Tang

(57) ABSTRACT

Systems and methods are disclosed herein for updating stored User Equipment (UE) context information upon resuspend of the UE in response to a resume request from the UE. In some embodiments, a method in a UE comprises transmitting a Radio Resource Control (RRC) resume request message and, in response to the RRC resume request message, receiving an RRC connection release message with an indication for suspend. The method further comprises, in response to receiving the RRC connection release message with an indication for suspend, replacing information in a stored Access Stratum (AS) context of the UE with new information.

20 Claims, 15 Drawing Sheets

Related U.S. Application Data

(60) Provisional application No. 62/657,974, filed on Apr. 16, 2018.

(56) References Cited

U.S. PATENT DOCUMENTS

| | | | |
|---|---|---|---|
| 2017/0202051 A1* | 7/2017 | Hwang | H04W 76/19 |
| 2017/0325282 A1 | 11/2017 | Hong et al. | |
| 2018/0270894 A1 | 9/2018 | Park et al. | |
| 2019/0357105 A1* | 11/2019 | Zhang | H04W 36/18 |

OTHER PUBLICATIONS

HTC, "Network controlled mobility to 5GC or EPC", 3GPP TSG-RAN WG2#101bis, R2-1805950, Apr. 16-20, 2018, Sanya, China.
3rd Generation Partnership Project; Technical Specification Group Services and System Aspects; Study on Architecture for Next Generation System(Release 14), 3GPP TR 23.799 V1.2.0, Nov. 2016.

* cited by examiner

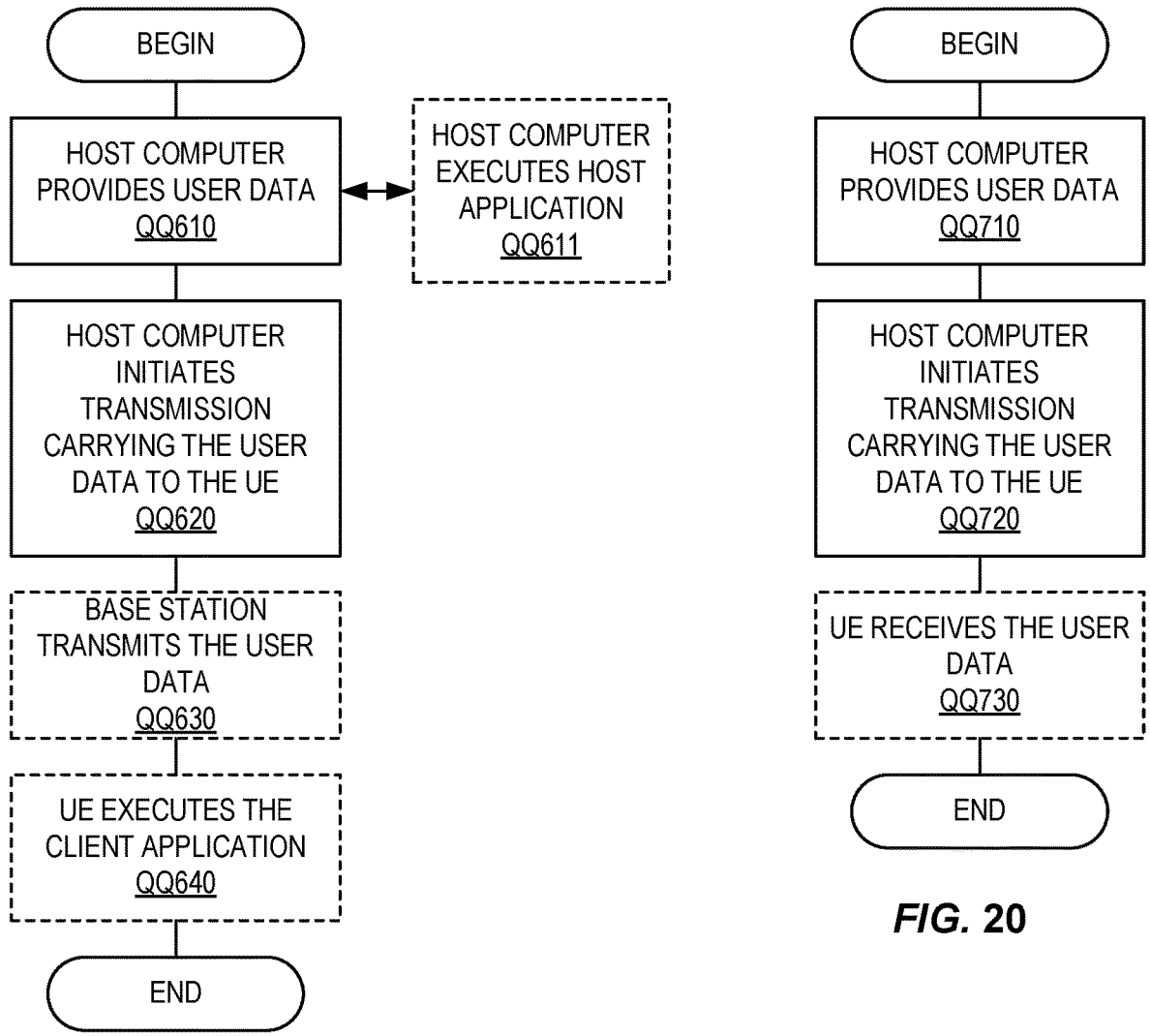

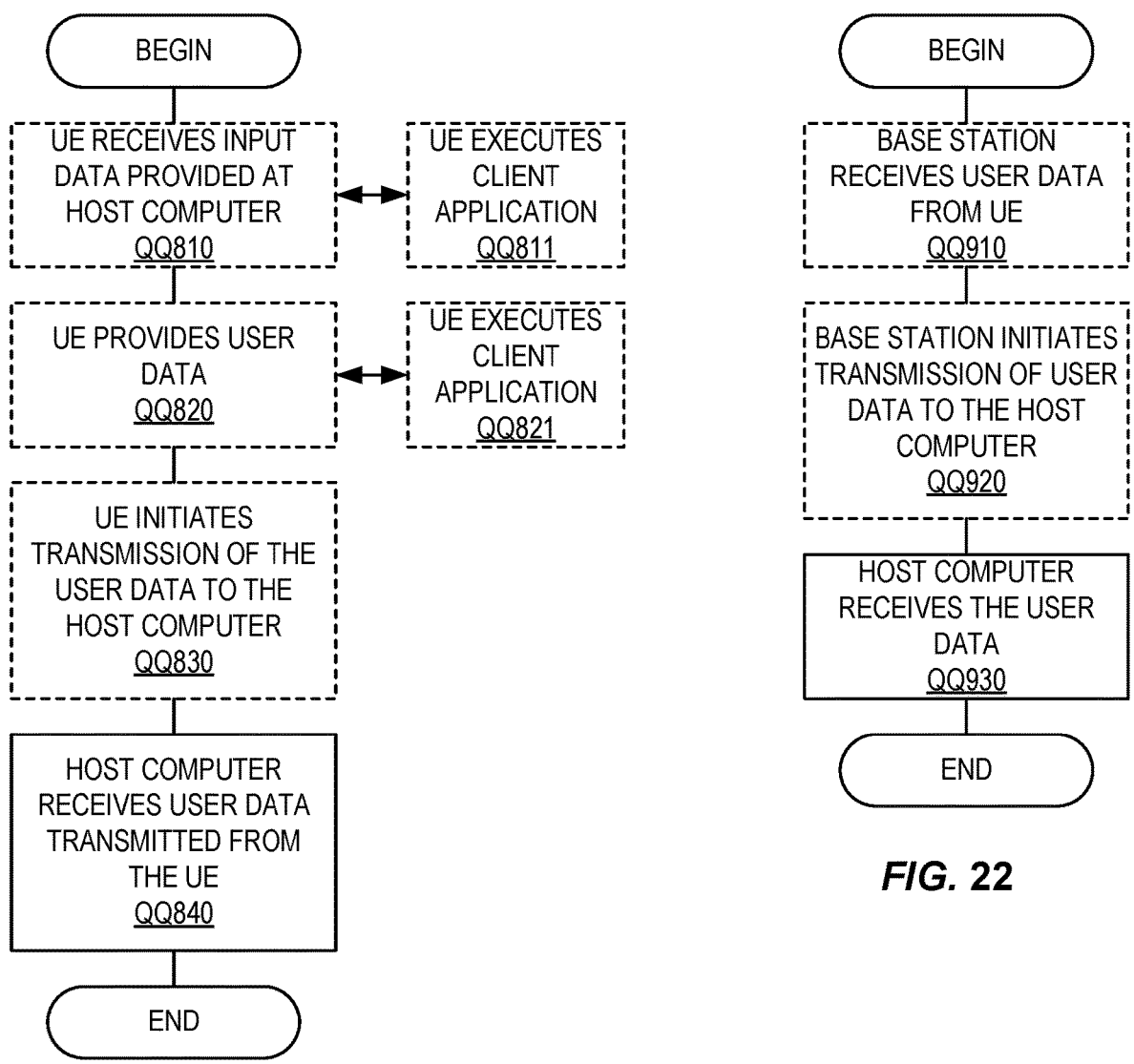

HANDLING OF INACTIVE PARAMETERS UPON RELEASE AND RE-SUSPEND

RELATED APPLICATIONS

This application is continuation application of U.S. patent application Ser. No. 16/386,148, filed Apr. 16, 2019, which claims the benefit of provisional patent application Ser. No. 62/657,974, filed Apr. 16, 2018, the disclosure of which is hereby incorporated herein by reference in its entirety.

TECHNICAL FIELD

The present disclosure relates to connection resume/suspend in a wireless communication system.

BACKGROUND

In Long Term Evolution (LTE) Release 13 a mechanism was introduced for the User Equipment (UE) to be suspended by the network. This suspended state is similar to RRC_IDLE. However, unlike the RRC_IDLE state, the UE stores the Access Stratum (AS) context or Radio Resource Control (RRC) context. This makes it possible to reduce the signaling when the UE is becoming active again by resuming the RRC connection, instead of establishing the RRC connection from scratch, as in prior releases. Reducing the signaling may have several benefits such as reducing latency (e.g. for smart phones accessing the Internet) and/or reducing signaling leads such that battery consumption is reduced for machine type devices sending very little data.

The Release 13 solution is based on the UE sending an RRCConnectionResumeRequest message to the network and receiving an RRCConnectionResume message from the network in response. The RRCConnectionResume message is not encrypted but integrity protected.

As part of the standardized work on Fifth Generation (5G) New Radio (NR) in the Third Generation Partnership Project (3GPP), it has been decided that NR should support an RRC_INACTIVE state with similar properties as the suspended state in LTE Release 13. The RRC_INACTIVE has slightly different properties from the suspended state in that it is a separate RRC state and not part of RRC_IDLE as in LTE. Additionally the Core Network (CN)/Radio Access Network (RAN) connection (Next Generation (NG) or N2 interface) is kept for RRC_INACTIVE, whereas it was suspended in LTE.

FIG. 1 illustrates possible UE state transitions in NR. The properties of the states illustrated in FIG. 1 are as follows:

RRC_IDLE:
A UE specific Discontinuous Reception (DRX) may be configured by upper layers;
UE controlled mobility based on network configuration;
The UE:
Monitors a Paging channel for CN paging using 5G System Architecture Evolution (SAE) Temporary Mobile Subscriber Identity (TMSI) (5G-S-TMSI);
Performs neighboring cell measurements and cell (re-) selection;
Acquires system information.
RRC_INACTIVE:
A UE specific DRX may be configured by upper layers or by RRC layer;
UE controlled mobility based on network configuration;
The UE stores the AS context;

The UE:
Monitors a Paging channel for CN paging using 5G-S-TMSI and RAN paging using Inactive Radio Network Temporary Identifier (I-RNTI);
Performs neighboring cell measurements and cell (re-) selection;
Performs RAN-based notification area updates periodically and when moving outside the RAN-based notification area;
Acquires system information.
RRC_CONNECTED:
The UE stores the AS context;
Transfer of unicast data to/from UE;
At lower layers, the UE may be configured with a UE specific DRX;
For UEs supporting Carrier Aggregation (CA), use of one or more Secondary Cells (SCells), aggregated with the Special Cell (SpCell), for increased bandwidth;
For UEs supporting Dual Connectivity (DC), use of one Secondary Cell Group (SCG), aggregated with the Master Cell Group (MCG), for increased bandwidth;
Network controlled mobility, i.e. handover within NR and to/from Evolved Universal Mobile Telecommunications Service (UMTS) Terrestrial RAN (E-UTRAN);
The UE:
Monitors a Paging channel;
Monitors control channels associated with the shared data channel to determine if data is scheduled for it;
Provides channel quality and feedback information;
Performs neighboring cell measurements and measurement reporting;
Acquires system information.

In LTE, an RRC_CONNECTED UE can be suspended by receiving an RRCConnectionRelease message with a suspend indicator. Upon receiving that message, the UE stores some parameters and deletes others. Some of these stored parameters, provided by the source node that is suspending the UE, are used by the UE when the UE attempts to resume the connection.

More particularly, upon receiving an indication to be suspended, the UE stores the AS context including the RRC configuration used in RRC_CONNECTED and the following parameters associated with the last source Primary Cell (PCell) the UE was connected to when the UE was in RRC_CONNECTED:
Cell Radio Network Temporary Identifier (C-RNTI) of the last PCell in RRC_CONNECTED;
Cell Identity (28 bits value that identifies a cell within a Public Land Mobile Network (PLMN)) of the last PCell in RRC_CONNECTED;
Physical Cell Identity (PCI) of the last PCell in RRC_CONNECTED.

Further details relating to how the UE behaves according to the LTE standard in response to receiving an RRCConnectionRelease message are found in Appendix A.

When the RRC_IDLE UE with suspend configuration wants to resume (i.e., in LTE), the stored parameters (C-RNTI, Cell Identity, and PCI) associated with the last PCell the UE was connected to when the UE was in RRC_CONNECTED are used in the RRC Resume procedure to compute the short Message Authentication Code for Integrity (MAC-I) security token so that the UE can be recognized by the source node hosting the UE AS context. This enables the source node to accept a context fetch request from the target node. Further details relating this procedure may be found in Appendix B.

There currently exist certain challenge(s). In NR RRC, which is different from LTE RRC, the network may respond to a ResumeRequest from the UE with a Suspend message (or equivalent, such as a Release message with a suspend indication or configuration) which immediately orders the UE back to RRC_INACTIVE state. LTE does not permit sending a suspend message (e.g., a release message with a suspend indication) directly to the UE trying to resume the connection, as in the example shown in FIG. 2. Rather, this feature is new in NR.

In NR RRC, the network may alternatively respond to a ResumeRequest from the UE with a Release message (i.e., without a suspend indication) which immediately orders the UE back to RRC_IDLE state. This message is encrypted. LTE does not permit sending a release message directly to the UE trying to resume the connection, as in the example shown in FIG. 3. Rather, this feature is also new in NR.

Currently known procedures for RRC connection handling (e.g., in NR draft specifications) adopt features similar to LTE. However, RRC connection handling when a UE is re-suspended are not well developed or understood.

SUMMARY

Systems and methods are disclosed herein for updating stored User Equipment (UE) context information upon re-suspend of the UE in response to a resume request from the UE. In some embodiments, a method in a UE comprises transmitting a Radio Resource Control (RRC) resume request message and, in response to the RRC resume request message, receiving an RRC connection release message with an indication for suspend. The method further comprises, in response to receiving the RRC connection release message with an indication for suspend, replacing information in a stored Access Stratum (AS) context of the UE with new information. Replacing the information in the stored AS context of the UE comprises: replacing stored security context information with security context information comprised in the RRC connection release message; replacing a stored Inactive Radio Network Temporary Identifier (I-RNTI) with an I-RNTI comprised in the RRC connection release message; replacing a stored cell identity with a cell identity of a cell in which the UE sent the RRC resume request message and received the RRC connection release message; replacing a stored Physical Cell Identity (PCI) with a PCI of the cell in which the UE sent the RRC resume request message and received the RRC connection release message; or replacing a stored Cell Radio Network Temporary Identifier (C-RNTI) with a C-RNTI obtained by the UE for the cell in which the UE sent the RRC resume request message and received the RRC connection release message. In this manner, the stored AS context of the UE is updated upon re-suspend of the UE.

In some embodiments, the method further comprises determining that the RRC connection release message comprises security context information, and replacing the information in the stored AS context of the UE comprises replacing the stored security context information with the security context information comprised in the RRC connection release message.

In some embodiments, the method further comprises determining that the RRC connection release message comprises an I-RNTI, and replacing the information in the stored AS context of the UE comprises replacing the stored I-RNTI with the I-RNTI comprised in the RRC connection release message.

In some embodiments, the method further comprises obtaining the cell identity of the cell prior to sending the RRC resume request message, and replacing the information in the stored AS context of the UE comprises replacing the stored cell identity with the cell identity of the cell in which the UE sent the RRC resume request message and received the RRC connection release message.

In some embodiments, the method further comprises obtaining the PCI of the cell prior to sending the RRC resume request message, and replacing the information in the stored AS context of the UE comprises replacing the stored PCI with the PCI of the cell in which the UE sent the RRC resume request message and received the RRC connection release message.

In some embodiments, the method further comprises obtaining the C-RNTI for the cell prior to sending the RRC resume request message, and replacing the information in the stored AS context of the UE comprises replacing the stored C-RNTI with the C-RNTI obtained by the UE for the cell in which the UE sent the RRC resume request message and received the RRC connection release message.

In some embodiments, the C-RNTI obtained by the UE for the cell in which the UE sent the RRC resume request message and received the RRC connection release message is a temporary C-RNTI.

In some embodiments, the method further comprises, after replacing the information in the stored AS context of the UE to provide an updated AS context of the UE, using the updated AS context of the UE to send a subsequent RRC resume request. In some embodiments, using the updated AS context of the UE to send the subsequent RRC resume request comprises using the updated AS context to calculate a security integrity token comprised in the subsequent RRC resume request.

Embodiments of a UE are also disclosed. In some embodiments, a UE is adapted to transmit a RRC resume request message and, in response to the RRC resume request message, receive an RRC connection release message with an indication for suspend. The UE is further adapted to, in response to receiving the RRC connection release message with an indication for suspend, replace information in a stored AS context of the UE with new information. In order to replace the information in the stored AS context of the UE, the UE is further adapted to: replace stored security context information with security context information comprised in the RRC connection release message; replace a stored I-RNTI with an I-RNTI comprised in the RRC connection release message; replace a stored cell identity with a cell identity of a cell in which the UE sent the RRC resume request message and received the RRC connection release message; replace a stored PCI with a PCI of the cell in which the UE sent the RRC resume request message and received the RRC connection release message; or replace a stored C-RNTI with a C-RNTI obtained by the UE for the cell in which the UE sent the RRC resume request message and received the RRC connection release message.

In some other embodiments, a UE comprises a radio interface and processing circuitry associated with the radio interface. The processing circuitry is configured to cause the UE to transmit a RRC resume request message and, in response to the RRC resume request message, receive an RRC connection release message with an indication for suspend. The processing circuitry is further configured to cause the UE to, in response to receiving the RRC connection release message with an indication for suspend, replace information in a stored AS context of the UE with new information. In order to replace the information in the stored AS context of the UE, the processing circuitry is further configured to cause the UE to: replace stored security context information with security context information comprised in the RRC connection release message; replace a stored I-RNTI with an I-RNTI comprised in the RRC connection release message; replace a stored cell identity with a cell identity of a cell in which the UE sent the RRC resume request message and received the RRC connection release message; replace a stored PCI with a PCI of the cell in which the UE sent the RRC resume request message and received the RRC connection release message; or replace a stored C-RNTI with a C-RNTI obtained by the UE for the cell in which the UE sent the RRC resume request message and received the RRC connection release message.

Embodiments of a method in a network node are also disclosed. In some embodiments, a method in network node for updating a UE AS context stored for a UE upon re-suspending the UE in response to a RRC resume request from the UE comprises receiving, from a UE, a RRC resume request message and, in response to receiving the RRC resume request message, transmitting, to the UE, an RRC connection release message with an indication for suspend. The method further comprises, in response to transmitting the RRC connection release message with an indication for suspend, replacing information in a stored AS context of the UE with new information. Replacing the information in the stored AS context of the UE comprises: replacing stored security context information with security context information comprised in the RRC connection release message; replacing a stored I-RNTI with an I-RNTI comprised in the RRC connection release message; replacing a stored cell identity with a cell identity of a cell in which the UE sent the RRC resume request message and received the RRC connection release message; replacing a stored PCI with a PCI of the cell in which the UE sent the RRC resume request message and received the RRC connection release message; or replacing a stored C-RNTI with a C-RNTI obtained by the UE for the cell in which the UE sent the RRC resume request message and received the RRC connection release message.

In some embodiments, replacing the information in the stored AS context of the UE comprises replacing the stored security context information with the security context information comprised in the RRC connection release message.

In some embodiments, replacing the information in the stored AS context of the UE comprises replacing the stored I-RNTI with the I-RNTI comprised in the RRC connection release message.

In some embodiments, replacing the information in the stored AS context of the UE comprises replacing the stored cell identity with the cell identity of the cell in which the UE sent the RRC resume request message and received the RRC connection release message.

In some embodiments, replacing the information in the stored AS context of the UE comprises replacing the stored PCI with the PCI of the cell in which the UE sent the RRC resume request message and received the RRC connection release message.

In some embodiments, replacing the information in the stored AS context of the UE comprises replacing the stored C-RNTI with the C-RNTI obtained by the UE for the cell in which the UE sent the RRC resume request message and received the RRC connection release message.

Embodiments of a network node are also disclosed. In some embodiments, a network node for updating a UE AS context stored for a UE upon re-suspending the UE in response to a RRC resume request from the UE is adapted to receive, from a UE, a RRC resume request message and, in response to receiving the RRC resume request message, transmit, to the UE, an RRC connection release message with an indication for suspend. The network node is further adapted to, in response to transmitting the RRC connection release message with an indication for suspend, replace information in a stored AS context of the UE with new information. In order to replace the information in the stored AS context of the UE, the network node is further adapted to: replace stored security context information with security context information comprised in the RRC connection release message; replace a stored I-RNTI with an I-RNTI comprised in the RRC connection release message; replace a stored cell identity with a cell identity of a cell in which the UE sent the RRC resume request message and received the RRC connection release message; replace a stored PCI with a PCI of the cell in which the UE sent the RRC resume request message and received the RRC connection release message; or replace a stored C-RNTI with a C-RNTI obtained by the UE for the cell in which the UE sent the RRC resume request message and received the RRC connection release message.

In some embodiments, a network node for updating a UE AS context stored for a UE upon re-suspending the UE in response to a RRC resume request from the UE comprises processing circuitry configured to cause the network node to receive, from a UE, a RRC resume request message and, in response to receiving the RRC resume request message, transmit, to the UE, an RRC connection release message with an indication for suspend. The processing circuitry is further configured to cause the network node to, in response to transmitting the RRC connection release message with an indication for suspend, replace information in a stored AS context of the UE with new information. In order to replace the information in the stored AS context of the UE, the processing circuitry is further configured to cause the network node to: replace stored security context information with security context information comprised in the RRC connection release message; replace a stored I-RNTI with an I-RNTI comprised in the RRC connection release message; replace a stored cell identity with a cell identity of a cell in which the UE sent the RRC resume request message and received the RRC connection release message; replace a stored PCI with a PCI of the cell in which the UE sent the RRC resume request message and received the RRC connection release message; or replace a stored C-RNTI with a C-RNTI obtained by the UE for the cell in which the UE sent the RRC resume request message and received the RRC connection release message.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 19 is a flowchart illustrating a method implemented in a communication system according to some embodiments disclosed herein;

FIG. 20 is a flowchart illustrating a method implemented in a communication system according to some embodiments disclosed herein;

FIG. 21 is a flowchart illustrating a method implemented in a communication system according to some embodiments disclosed herein; and FIG. 22 is a flowchart illustrating a method implemented in a communication system according to some embodiments disclosed herein.

DETAILED DESCRIPTION

Figure 1:
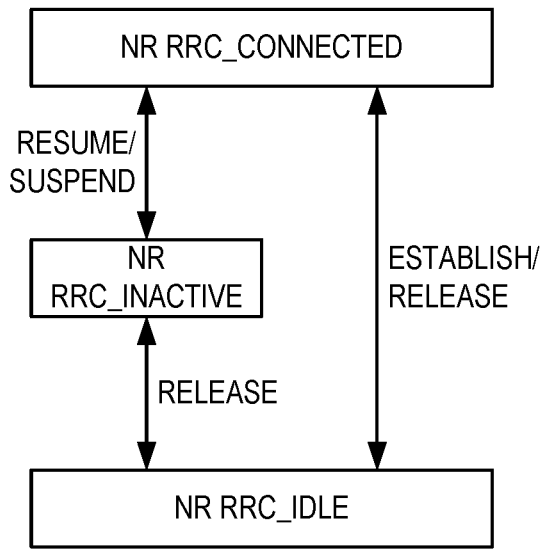
FIG. 1 illustrates possible User Equipment (UE) state transitions in New Radio (NR)
Figure 2:
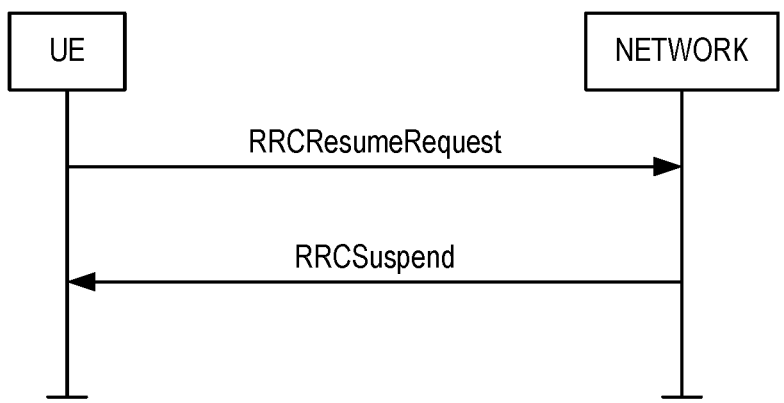
FIG. 2 illustrates the sending of a suspend message directly to a UE trying to resume its connection.
Figure 3:
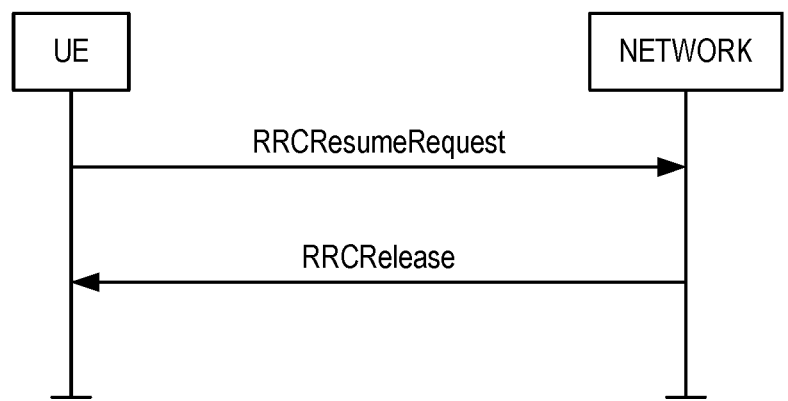
FIG. 3 illustrates the sending of a release message directly to a UE trying to resume its connection.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

As discussed in the Background section, currently known procedures for Radio Resource Control (RRC) connection handling (e.g., in New Radio (NR) draft specifications) adopt features similar to those in Long Term Evolution (LTE). However, RRC connection handling when a User Equipment (UE) is re-suspended are not well developed or understood. Details on one approach to re-suspending a UE may be found in Appendix C.

One approach that may be appropriate in NR is for the UE to derive new security keys (KgNB, Krrcint, etc.) prior to sending the RRCResumeRequest message. These keys may be used to calculate the security token used in the RRCResumeRequest message and used to encrypt and integrity protect the response message (RRCSuspend, RRCRelease, RRCResume). An example of such an approach may be found in Appendix D.

In the above discussed approaches, the UE does not store the UE Access Stratum (AS) Context including the current RRC configuration, the current security context, the Packet Data Convergence Protocol (PDCP) state including Robust Header Compression (ROHC) state, Cell Radio Network Temporary Identifier (C-RNTI) used in the source Primary Cell (PCell), the cellIdentity, and the Physical Cell Identity (PCI) of the source PCell in case it is receiving the RRCSuspend in response to an RRCResumeRequest. The assumption here is that the UE should use the old stored context the next time it sends an RRCResumeRequest.

This approach is less secure since the old security context (e.g. security keys) need to be re-used to derive new security keys, rather than using the fresh UE security keys which were generated before sending the RRCResumeRequest as the base keys for generating new security keys. Moreover, this approach also requires the network to store the old security context when it sends a RRCSuspend to the UE, to be used at the next attempt. Additionally the network needs to maintain more parameters which are related to the old node or cell for which the UE was last in Connected state such as C-RNTI in the old source PCell (i.e., the PCell in which the UE received the previous RRCSuspend), cellIdentity of the source PCell, and the PCI of the source PCell. These parameters would most likely be different from the ones used in the target node (i.e., the node to which the UE sends the RRCResumeRequest).

Using the old parameter as input to future RRCResumeRequest could introduce security issues as the usage of location dependent parameters to compute the integrity token in LTE is a strength of the LTE security solution for RRC Resume. However, with the above discussed NR approach, this principle is broken and, although the UE could be moving around and possibly updating its security parameters and the ones that are location dependent, the UE would keep using old parameters.

In addition, it is unclear what the UE would do upon receiving RRCRelease. For example, the UE may update these location dependent parameters or not. Moreover, although the UE may store some parameters, it is unclear what should happen if these parameters are already stored.

For example, with respect to the parameters resumeIdentity, nextHopChainingCount, ran-PagingCycle, and ran-NotificationAreaInfo, one approach may be for the UE to store these parameters every time the UE receives a RRCSuspend message, and only delete these parameters when the UE enters RRC_CONNECTED. This may create an ambiguity as to which parameters the UE should use in the suspend state since the UE could end up with multiple sets of the same parameters.

Certain aspects of the present disclosure and their embodiments may provide solutions to these or other challenges. In particular, embodiments described herein introduce a new mechanism to handle a set of inactive parameters (e.g., security context and location-based parameters used for the integrity token of Resume Request, paging and notification area parameters) upon receiving a Suspend message in response to transmitting an RRC Resume Request. These parameters may also be refreshed in the case the UE is performing a Resume Request and receives Suspend message. In this regard, these parameters may be kept fresh regardless of whether or not the UE enters RRC_CONNECTED. This is different from previous approaches in which the UE is required to enter RRC_CO-NNECTED and then be re-suspended to refresh these parameters.

Certain embodiments may provide one or more of the following technical advantage(s).

Particular embodiments of the present disclosure describe a clear UE behavior defined for subsequent Resume procedures. In at least some such embodiments, the UE refreshes the security related parameters when receiving a suspend message (or Release messages with a suspend configuration or indication).

In at least some such embodiments, this allows the security principle in LTE of using the latest location-based parameters to compute UE's security integrity token for inclusion in the RRC Resume Request (also called Resume Message Authentication Code for Integrity (MAC-I)) to be maintained.

Moreover, particular embodiments avoid the need for the network to retain old information created when the UE was last in connected state. That is, it is enough for particular embodiments to maintain the last context from the last time the UE was suspended. This may, for example, reduce network complexity.

Figure 4:
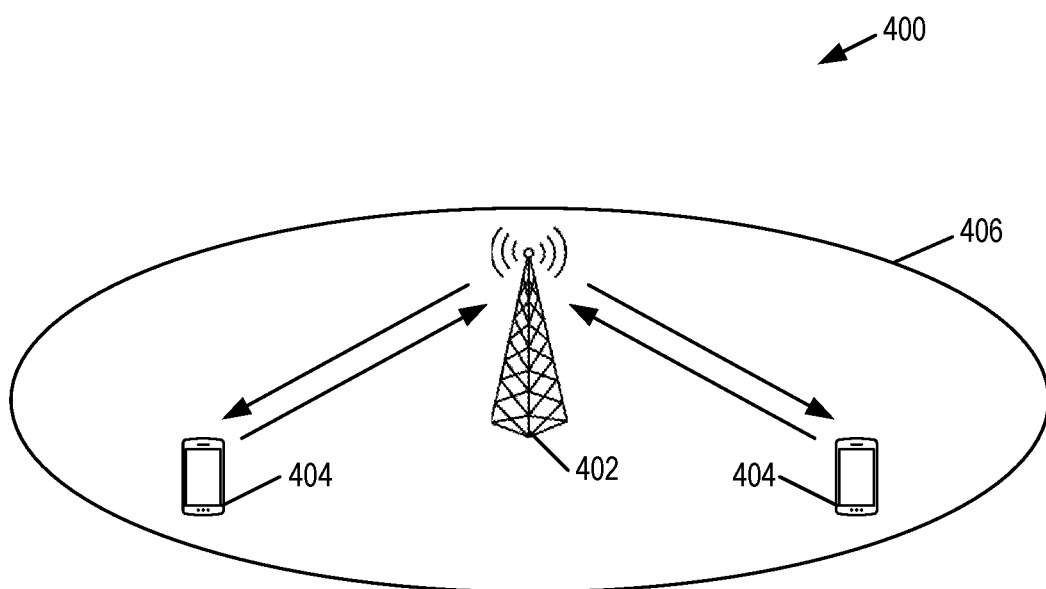
FIG. 4 illustrates an example wireless communication network, according to one or more embodiments.

FIG. 4 illustrates an example wireless communication network 400, according to one or more embodiments. The wireless communication network 400 supports communications between a base station 402 and a UE 404. The base station 402, sometimes referred to in applicable standards as an Evolved Node B (eNB) or Fifth Generation (5G) Node B (gNB), provides radio coverage to the UE 404 in a cell 406 of the wireless communication network 400.

The UE 404 may comprise, for example, a cellular telephone, a smart phone, a laptop computer, a notebook computer, a tablet, a Machine-to-Machine (M2M) communication device (also referred to as a Machine Type Communication (MTC) device), or other device with wireless communication capabilities. The base station 402 transmits data to the UE 404 in the downlink (DL) on the Physical Downlink Shared Channel (PDSCH), the Physical Downlink Control Channel (PDCCH), and the Physical Broadcast Channel (PBCH). The UE 404 transmits data to the base station 402 in the uplink (UL) on the Physical Uplink Shared Channel (PUSCH). The base station 402 and the UE 404 are configured to operate according to the 5G or NR standards.

The cell 406 may be identified by a PCI and/or a cell identity (cell ID). The PCI may be obtained by detecting a synchronization signal associated with the cell 406. The cell ID may be obtained from system information received from the base station 402 and associated with the cell 406.

Similar to LTE, NR will use Orthogonal Frequency Division Multiplexing (OFDM) in the downlink from a network node or base station (also known as an eNB or gNB) to a UE. In the uplink (i.e., from the UE to gNB), both OFDM and Discrete Fourier Transform (DFT)-spread OFDM will be supported.

Figure 5:
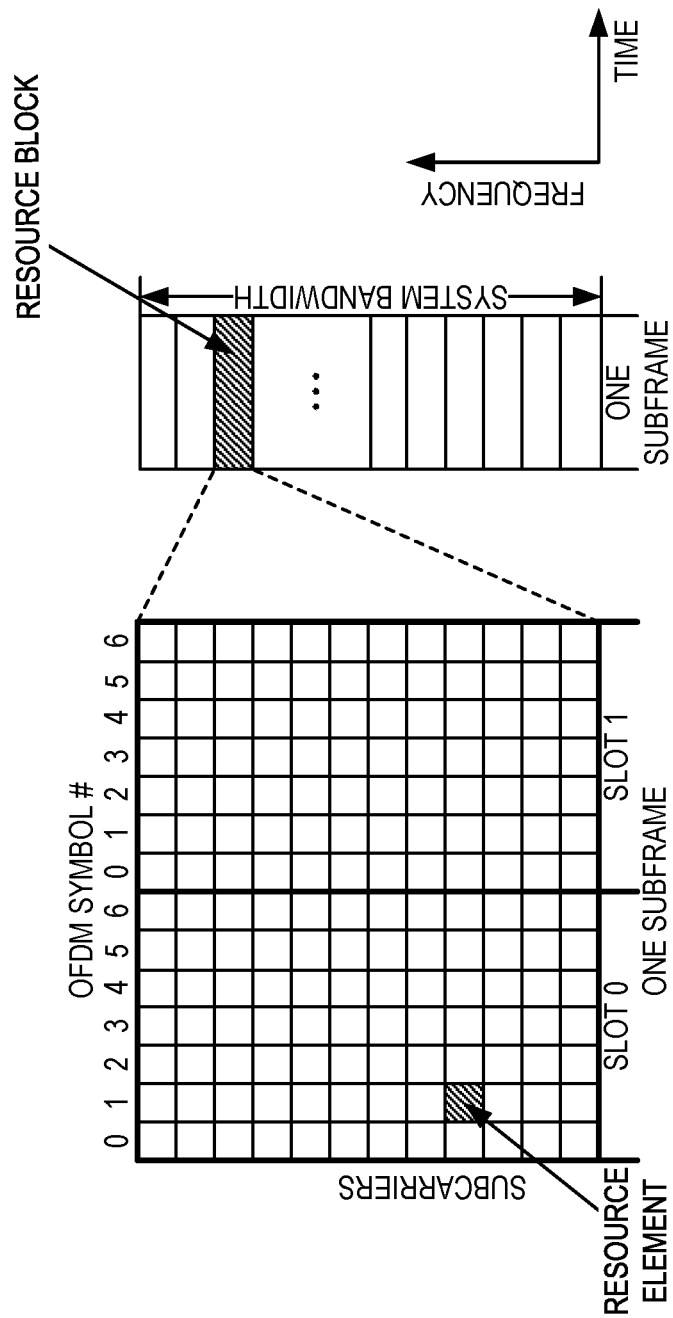
FIG. 5 illustrates an example of the basic NR physical resource represented as a time-frequency grid.

The basic NR physical resource for 5G and NR networks can be viewed as a time-frequency grid similar to the one in LTE as illustrated in FIG. 5, where each resource element corresponds to one OFDM subcarrier during one OFDM symbol interval. The spacing of the subcarriers may be 15 kilohertz (kHz), as shown in FIG. 5 and supported in LTE, or may be different, such as those supported in NR.

Furthermore, the resource allocation in LTE is typically described in terms of Resource Blocks (RBs), where a RB corresponds to one slot (0.5 milliseconds (ms)) in the time domain and 12 contiguous subcarriers in the frequency domain. An RB is also referred to as Physical RB (PRB). RBs are numbered in the frequency domain, starting with 0 from one end of the system bandwidth. For NR, an RB is also 12 subcarriers in frequency.

Figure 6:
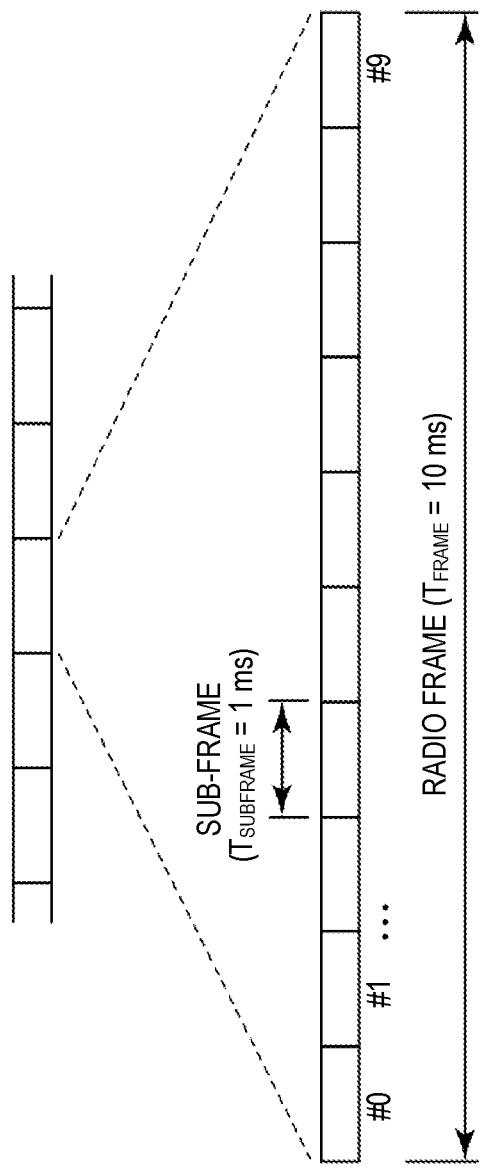
FIG. 6 illustrates an example time-domain structure for NR.

With respect to the time domain, embodiments may use the same PRB length as LTE, or a different one, depending on the embodiment. According to particular embodiments, the time domain of downlink and uplink transmissions in NR is organized into equally-sized subframes (similar to LTE) as shown in FIG. 6.

Downlink transmissions are dynamically scheduled, i.e., in each subframe the base station transmits Downlink Control Information (DCI) about which UE 404 data is to be transmitted to and which RBs in the current downlink subframe the data is transmitted on. This control signaling is typically transmitted in the first one or two OFDM symbols in each subframe in NR. The control information is carried on PDCCH and data is carried on PDSCH. A UE 404 first detects and decodes PDCCH and if a PDCCH is decoded successfully, it decodes the corresponding PDSCH based on the decoded control information in the PDCCH. Each UE 404 is assigned with a unique C-RNTI in the same serving cell. The Cyclic Redundancy Check (CRC) bits of a PDCCH for a UE 404 is scrambled by the UE 404's C-RNTI, so a UE 404 recognizes its PDCCH by checking the C-RNTI used to scramble the CRC bits of the PDCCH.

Uplink data transmissions are also dynamically scheduled using PDCCH. Similar to downlink, a UE 404 first decodes uplink grants in PDCCH and then transmits data over the PUSCH based on the decoded control information in the uplink grant such as modulation order, coding rate, uplink resource allocation, etc.

In LTE, Semi-Persistent Scheduling (SPS) is also supported in both uplink and downlink, in which a sequence of periodic data transmissions is activated or deactivated by a single PDCCH. There is no PDCCH transmitted for data transmissions after activation. In SPS, the PDCCH's CRC is scrambled by a SPS-C-RNTI, which is configured for a UE 404 if the UE 404 supports SPS.

In addition to PUSCH, Physical Uplink Control Channel (PUCCH) is also supported in NR to carry Uplink Control Information (UCI) such as Hybrid Automatic Repeat Request (HARQ) related Acknowledgement (ACK), Negative Acknowledgement (NACK), or Channel State Information (CSI) feedback.

The RRC protocol may be used on the Air interface between the UE 404 and the base station 402 (e.g., transported via the PDCP-Protocol). The RRC protocol generally relates to certain services and functions of the RRC sublayer, including e.g., connection establishment and release functions, broadcast of system information (e.g., relating to the Non-Access Stratum (NAS) and/or the AS), radio bearer establishment, reconfiguration and release, RRC connection mobility procedures, Quality of Service (QoS) management functions, UE measurement reporting and reporting control, paging notification and release, and outer loop power control. Moreover, RRC signaling may configure the user and control planes according to the network status and allows for Radio Resource Management (RRM) strategies to be implemented.

Particular embodiments of RRC are guided by a state machine which defines certain specific states in which a UE 404 may be. Particular states in this state machine have different amounts of radio resources associated with them and these are the resources that the UE 404 may use when present and in a given state. Since different amounts of resources are available at different states the quality of service that the user experiences, and the energy consumption of the UE, may be influenced by this state machine.

Although particular embodiments discussed herein are performed by a UE while in the RRC_INACTIVE state in NR, other embodiments may apply in other circumstances. For example, similar embodiments may include:

- LTE procedures instead of NR (e.g., with a UE in the RRC_INACTIVE state of LTE)
- Inter-Radio Access Technology (RAT) procedures in RRC_INACTIVE (e.g., between LTE and NR connected to the same 5G Core Network (CN)
- a UE that is in the LTE RRC_CONNECTED state that is suspended to LTE RRC_INACTIVE, performs mobility and camps on an NR cell (i.e. becomes in NR RRC_INACTIVE)
- a UE in NR RRC_CONNECTED that is suspended to NR RRC_INACTIVE, performs mobility and camps on an LTE cell (i.e. transit to LTE RRC_INACTIVE).

Figure 7:
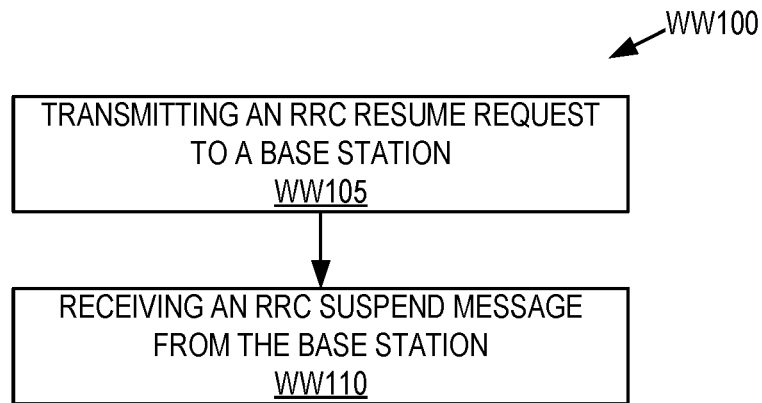
FIG. 7 depicts a method implemented in a wireless device (e.g., UE) in accordance with particular embodiments.

FIG. 7 depicts a method WW100 in accordance with particular embodiments. As is apparent from the discussion herein, the method WW100 is performed by the UE. The method WW100 includes transmitting an RRC Resume Request to a base station (block WW105) and receiving an RRC Suspend message from the base station in response to the transmitting (block WW110). While not illustrated, numerous embodiments are described below that relate to actions performed by the UE upon receiving the RRC Suspend message in response to the transmitted RRC Resume Request. In general, these embodiments relate to replacing or updating at least some of the information in the AS context of the UE stored at the UE.

Figure 8:
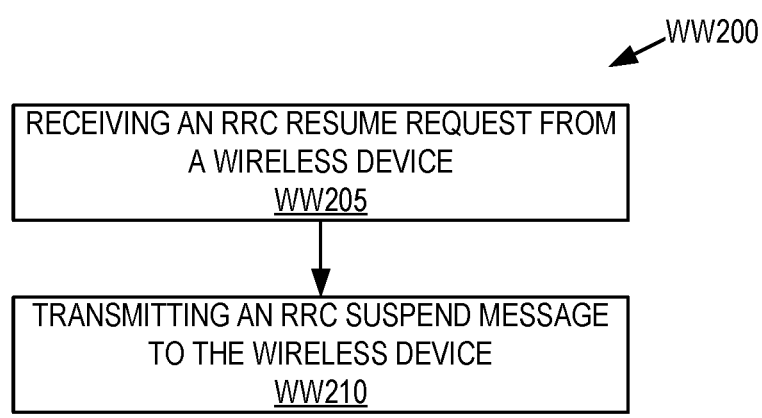
FIG. 8 depicts a method implemented in a base station in accordance with particular embodiments.

FIG. 8 depicts a method WW200 in accordance with other particular embodiments. As is apparent from the discussion herein, the method WW200 is performed by the base station. The method WW200 includes receiving an RRC Resume Request from a wireless device (block WW205), and transmitting an RRC Suspend message to the wireless device in response to the receiving (block WW210). While not illustrated, numerous embodiments are described below that relate to actions performed by the base station upon sending the RRC Suspend message in response to the RRC Resume Request. In general, these embodiments relate to replacing or updating at least some of the information in the AS context of the UE stored at the network side (e.g., at the base station or another network node).

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 9:
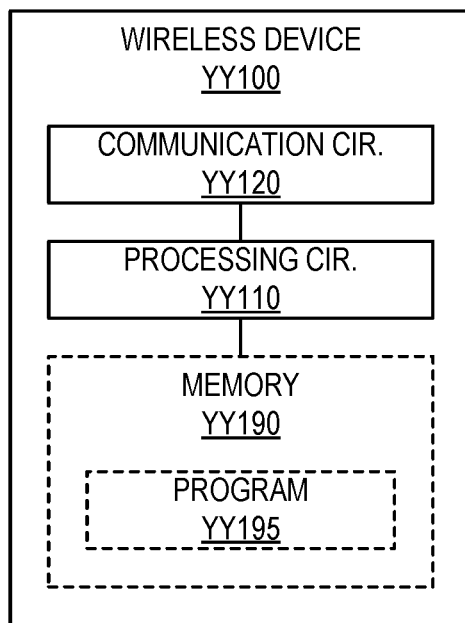
FIG. 9 illustrates one example embodiment of a wireless device.

FIG. 9 for example illustrates a wireless device YY100 as implemented in accordance with one or more embodiments. As is apparent from the description herein, a UE is one example of the wireless device YY100. As shown, the wireless device YY100 includes processing circuitry YY110 and communication circuitry YY120. The communication circuitry YY120 (e.g., radio circuitry) is configured to transmit and/or receive information to and/or from one or more other nodes, e.g., via any communication technology. Such communication may occur via one or more antennas that are either internal or external to the wireless device YY100. The processing circuitry YY110 is configured to perform processing described above, such as by executing instructions stored in memory YY190. The processing circuitry YY110 in this regard may implement certain functional means, units, or modules. In some embodiments, the processing circuitry YY110 is configured to execute instructions of a program YY195 stored in the memory YY190 of the wireless device YY100.

Figure 10:
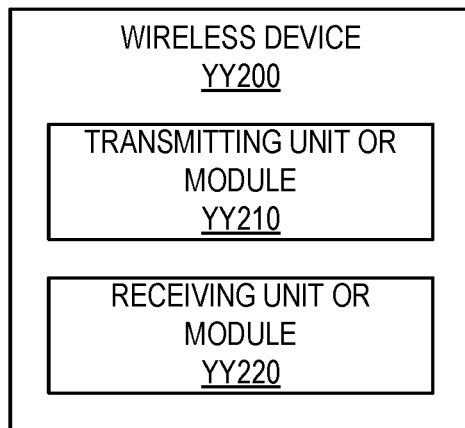
FIG. 10 illustrates another example embodiment of a wireless device.
Figure 14:
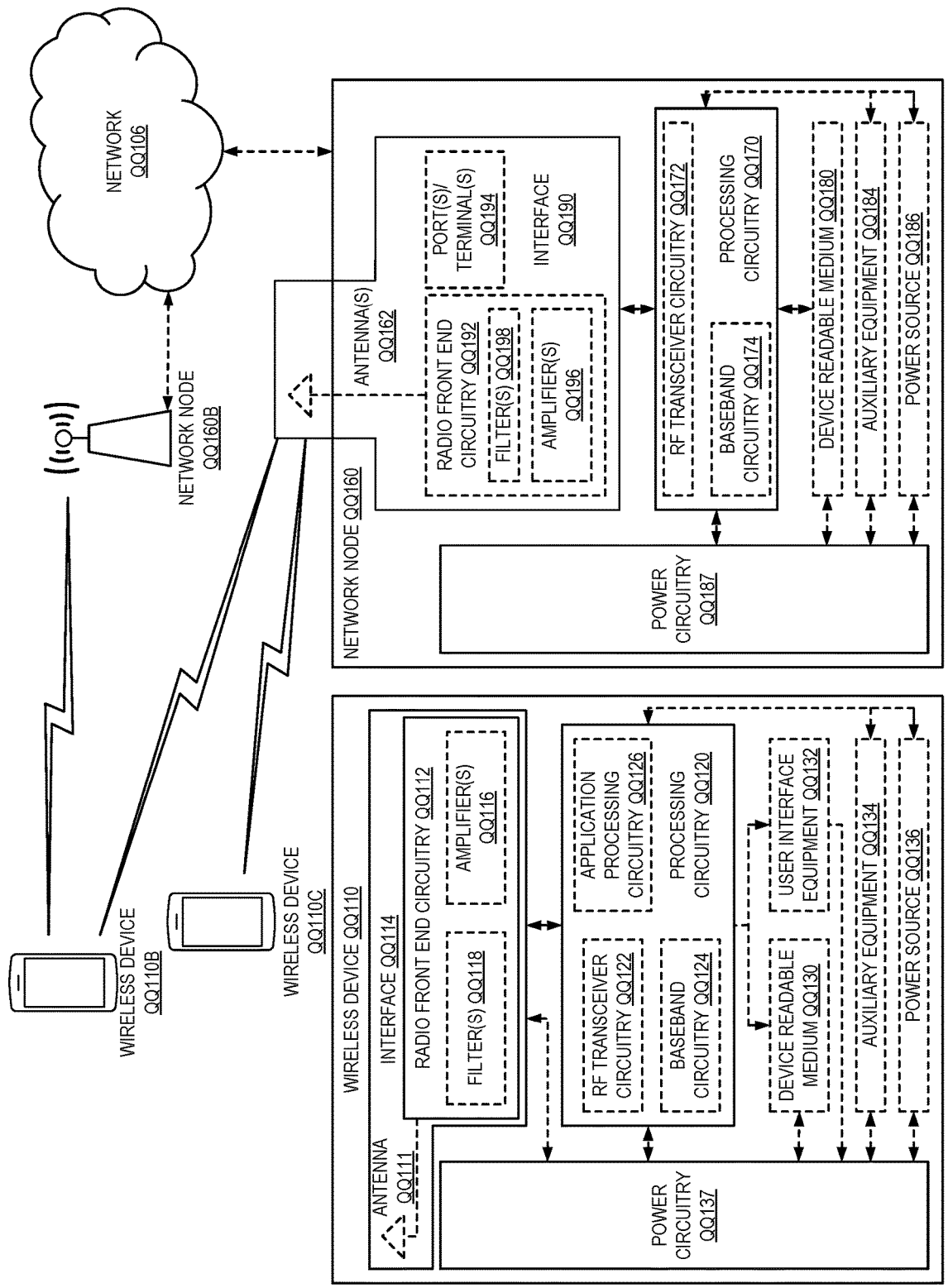
FIG. 14 illustrates an exemplary wireless network according to some embodiments disclosed herein.

FIG. 10 illustrates a schematic block diagram of a wireless device YY200 in a wireless network according to still other embodiments (for example, the wireless network shown in FIG. 14). As is apparent from the description herein, a UE is one example of the wireless device YY200. As shown, the wireless device YY200 implements various functional means, units, or modules, e.g., via the processing circuitry YY110 in FIG. 9 and/or via software code. These functional means, units, or modules, e.g., for implementing the method(s) herein, include (for instance) a transmitting unit or module YY210 and a receiving unit or module YY220. The transmitting unit or module YY210 is configured to transmit an RRC Resume Request to a base station 402. The receiving unit or module YY220 is configured to receive an RRC Suspend message from the base station 402 in response to the transmitting.

Figure 11:
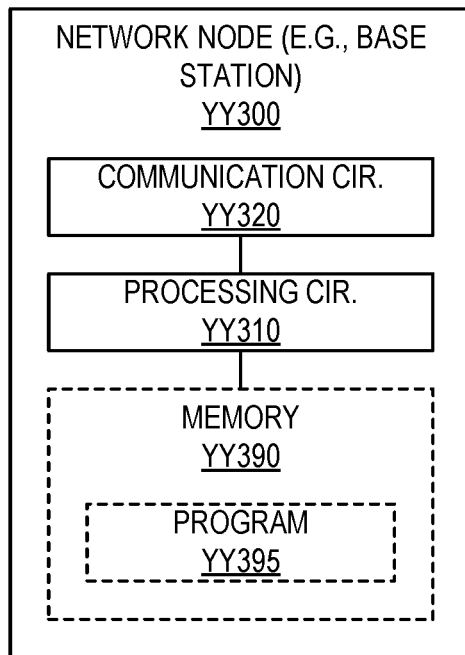
FIG. 11 illustrates one example embodiment of a base station.

FIG. 11 illustrates a network node YY300 as implemented in accordance with one or more embodiments. As is apparent from the description herein, a base station is one example of the network node YY300. As shown, the network node YY300 includes processing circuitry YY310 and communication circuitry YY320. The communication circuitry YY320 is configured to transmit and/or receive information to and/or from one or more other nodes, e.g., via any communication technology. The processing circuitry YY310 is configured to perform processing described above, such as by executing instructions of a program YY395 stored in memory YY390. The processing circuitry YY310 in this regard may implement certain functional means, units, or modules.

Figure 12:
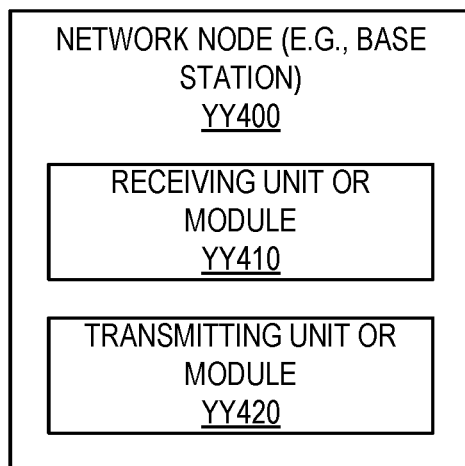
FIG. 12 illustrates another example embodiment of a base station.

FIG. 12 illustrates a schematic block diagram of a network node (e.g., base station) YY400 in a wireless network according to still other embodiments (for example, the wireless network shown in FIG. 14). As is apparent from the description herein, a base station is one example of the network node YY400. As shown, the network node YY400 implements various functional means, units, or modules, e.g., via the processing circuitry YY310 in FIG. 11 and/or via software code. These functional means, units, or modules, e.g., for implementing the method(s) herein, include (for instance) a receiving unit or module YY410 and a transmitting unit or module YY420. The receiving unit or module YY410 is configured to receive an RRC Resume Request from a wireless device 404. The transmitting unit or module YY420 is configured to transmit an RRC Suspend message to the wireless device 404 in response to the receiving.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

In a first embodiment, upon receiving an RRC Suspend message (or Release message with some indication for suspend) in response to an RRC Resume Request, if the message contains AS security context information the UE overrides any stored AS security context (if any stored) i.e. it deletes and stores the newly received value.

In a second embodiment, upon receiving an RRC Suspend message (or Release message with some indication for suspend) in response to an RRC Resume Request, if the message contains an Inactive Radio Network Temporary Identifier (I-RNTI), the UE overrides any stored I-RNTI (if any stored), i.e. it deletes and stores the newly received value.

Note (equivalent network embodiments): A counter-part in the network side shall also perform these updates for security context and I-RNTI (or any kind of resume identifier).

In a third embodiment, upon receiving an RRC Suspend message (or Release message with some indication for suspend) in response to an RRC Resume Request, the UE updates location-based parameters, such as the PCI and the Cell Identity.

In one variant of this third embodiment, this update consists of deleting the previously stored PCI and storing the PCI associated to the cell where the UE has sent the Resume Request, i.e. the cell the UE is camping when it sends the message and receives the Release as a response. The PCI is obtained by detecting the Synchronization Signals (SS) associated to that cell, i.e. SS Block(s).

In another variant of this embodiment, this update consists of deleting the previously stored Cell Identifier and storing the Cell Identifier associated to the cell where the UE has sent the Resume Request, i.e. the cell the UE is camping when it sends the message and receives the Release as a response. The Cell Identity can be obtained by reading system information associated to that cell.

In another variant of this third embodiment, this update could be indicated whether it shall be done or not by the UE.

Note that there are corresponding network embodiments. That is, a counter-part in the network side shall also perform these updates. In other words, the AS context is updated such a way that the previously stored PCI is deleted and the new one is stored. Also, the previously stored Cell Identity is deleted and the new one is stored.

In a fourth embodiment, upon receiving an RRC Suspend message (or Release message with some indication for suspend) in response to an RRC Resume Request, the UE updates the C-RNTI information.

In one variant of this fourth embodiment, this update consists of deleting the previously stored C-RNTI, obtaining the temporary C-RNTI upon performing random access towards a new cell where the UE wants to send the RRC Resume Request, where the temporary C-RNTI is received in Random Access Response associated to that cell and storing that temporary C-RNTI as the new C-RNTI to be used in subsequent Resume Request attempts. For example, the C-RNTI can be used as input to compute the UE's security integrity token to be included in the RRC Resume Request.

In another variant of this fourth embodiment, this update consists of deleting the previously stored C-RNTI, obtaining the temporary C-RNTI and using it as in the previous variant, except if contention resolution exists and the C-RNTI is updated. In that case, the updated C-RNTI shall be stored by the UE to be used in subsequent Resume procedures.

In another variant of this fourth embodiment, this update could be indicated whether it shall be done or not by the UE.

In another variant of this fourth embodiment, this update is done based on a new C-RNTI received in the Suspend message itself (or the Release message with suspend indication).

In a fifth embodiment, upon receiving an RRC Suspend message (or Release message with some indication for suspend) in response to an RRC Resume Request, if the message contains an NCC (nextHopChainingCount), Radio Access Network (RAN) paging configuration (ran-PagingCycle) or RAN Notification Area Configuration (ran-NotificationArealnfo), the UE overrides any of these information that is stored (if any stored), i.e. it deletes and stores the newly received value associated. This is different from current draft specification where the UE just stores the parameters.

In a variant of the fifth embodiment, also applicable to the other embodiments describing an overriding rule, the overriding rule is implemented using need codes, i.e. a code that indicates to the UE that a parameter is stored and, upon receiving a new one, that previous value is overridden, i.e. deleted and replaced by the new value. That can be used in combination with procedure text also.

One or more of the solutions described herein may be implemented in, e.g., NR RRC specification 38.331 in accordance with the examples found in Appendix E, any provisions of which may be applied individually or in any combination.

Figure 13:
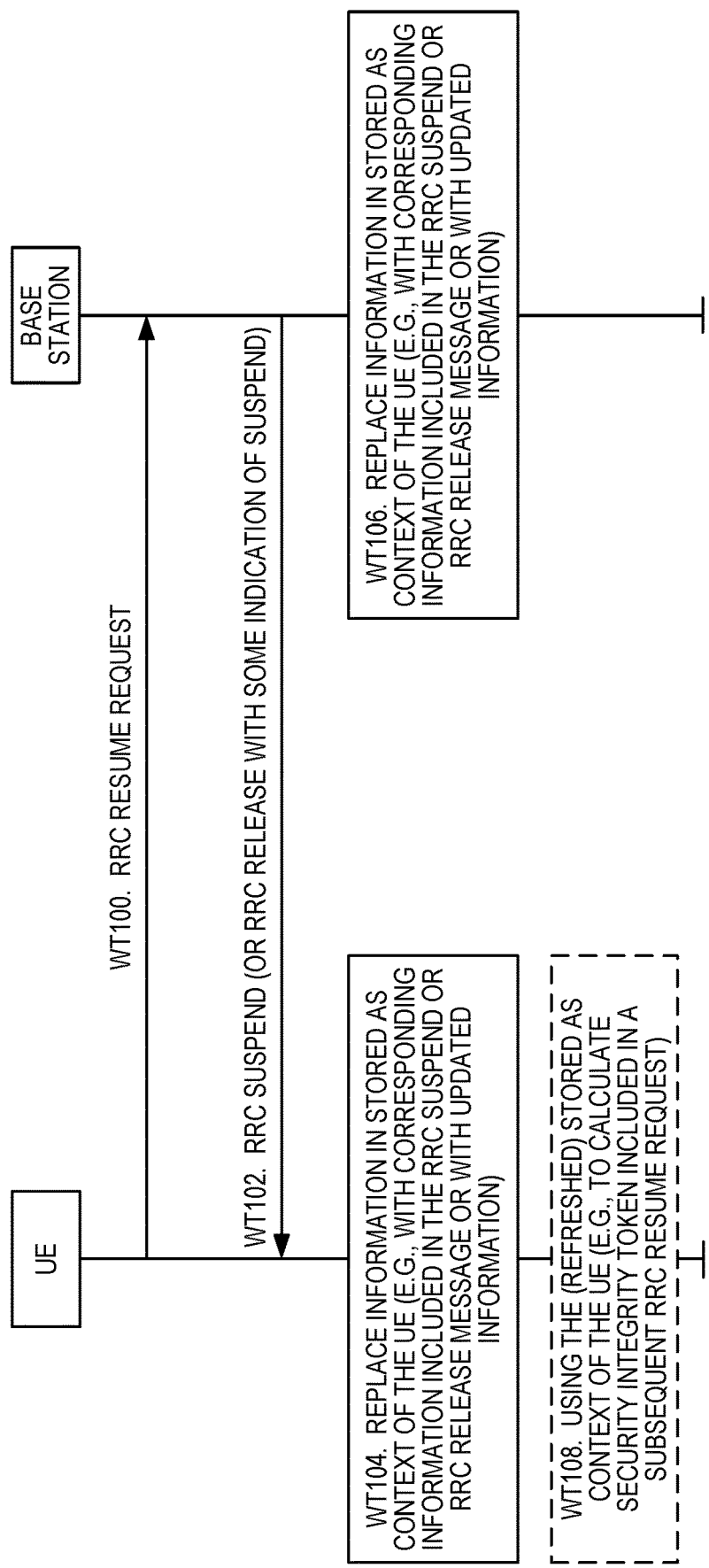
FIG. 13 illustrates the operation of a UE and a base station to refresh a stored Access Stratum (AS) context of the UE upon re-suspend of the UE in response to a resume request from the UE in accordance with some embodiments of the present disclosure.

FIG. 13 illustrates the operation of a UE and a base station in accordance with at least some aspects of the embodiments of the present disclosure described above. As illustrated, the UE transmits an RRC Resume Request to the base station (step WT100). In response to the RRC Resume Request, the base station transmits, and the UE receives, a RRC Suspend message or an RRC Release message including an indication for suspend (step WT102). At the UE, in response to receiving the RRC Suspend message or the RRC Release message including the indication for suspend, the UE replaces information in a stored AS context of the UE with new information (step WT104). A number of embodiments and variants thereof are described above with respect to what information in the stored AS context of the UE can be replaced.

More specifically, as discussed above with respect to the "first embodiment", upon receiving the RRC Suspend message (or Release message with some indication for suspend) in response to an RRC Resume Request, if the message contains AS security context information, the UE overrides (i.e., replaces) any stored AS security context (if any stored) with the new AS security context information contained in the message. In other words, the UE determines whether the received RRC Suspend message or RRC release message with some indication of suspend contains AS security context information. If so, the UE replaces the corresponding stored AS security context information with the received AS security context. In this manner, the stored AS context of the UE is refreshed (i.e., updated).

In addition or alternatively, as discussed above with respect to the "second embodiment", upon receiving the RRC Suspend message (or Release message with some indication for suspend) in response to the RRC Resume Request, if the message contains an I-RNTI, the UE overrides (i.e., replaces) any stored I-RNTI (if any stored) with the I-RNTI contained in the message. In other words, the UE determines whether the received RRC Suspend message or RRC release message with some indication of suspend contains an I-RNTI. If so, the UE replaces the corresponding stored I-RNTI with the received I-RNTI. In this manner, the stored AS context of the UE is refreshed (i.e., updated).

In addition or alternatively, as discussed above with respect to the "third embodiment", upon receiving the RRC Suspend message (or Release message with some indication for suspend) in response to an RRC Resume Request, the UE updates location-based parameters, such as the PCI and the Cell Identity in the stored AS context at the UE. As discussed above, the PCI and/or Cell Identity are, in some variants, the PCI and/or Cell Identity associated to the cell where the UE has sent the Resume Request, i.e. the cell the UE is camping when it sends the RRC Resume Request and receives the RRC Suspend message (or RRC Release message with some indication for suspend).

In addition or alternatively, as discussed above with respect to the "fourth embodiment", upon receiving the RRC Suspend message (or Release message with some indication for suspend) in response to the RRC Resume Request, the UE updates the C-RNTI information. In other words, the UE replaces a stored C-RNTI in the stored AS context of the UE with a newly obtained C-RNTI, where this newly obtained C-RNTI is associated to the cell in which the UE transmits the RRC Resume Request in step WT100 and receives the RRC Suspend or RRC Release with some indication of suspend in step WT102.

In addition or alternatively, as discussed above with respect to the "fifth embodiment", the base station may instruct to the UE as to which parameters in the stored AS context of the UE are or may be replaced.

In some embodiments, in response to transmitting the RRC Suspend message or the RRC Release message including the indication for suspend, the base station may also replace information in a stored AS context of the UE on the network-side, as discussed above (step WT106). The stored AS context of the UE may be stored by the base station or some other network node. The details of the replacing of the information in the stored AS context are the same as that described above with respect to, e.g., the "first embodiment", the "second embodiment", the "third embodiment", and the "fourth embodiment" for the UE. As such, the details are not repeated here.

In some embodiments, after replacing the information in the stored AS context of the UE to provide an updated AS context of the UE, the UE uses the updated AS context of the UE to send a subsequent RRC resume request (step WT108). In some embodiments, as discussed above, the UE uses information contained in the updated AS context to calculate a security integrity token (e.g., MAC-I) comprised in the subsequent RRC resume request.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network QQ106, network nodes QQ160 and QQ160*b*, and WDs QQ110, QQ110*b*, and QQ110*c*. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, Narrowband Internet of Things (NB-IoT), and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

Network QQ106 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio access points), Base Stations (BSs) (e.g., radio base stations, Node Bs, eNBs and gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such remote radio units may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or Base Station Controllers (BSCs), Base Transceiver Stations (BTSs), transmission points, transmission nodes, Multi-Cell/Multicast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a Node B component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple Node Bs. In such a scenario, each unique Node B and RNC pair, may in some instances be considered a single separate network node. In some embodiments, network node QQ160 may be configured to support multiple RATs. In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, Wideband Code Division Multiple Access (WCDMA), LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, Central Processing Unit (CPU), DSP, Application Specific Integrated Circuit (ASIC), Field Programmable Gate Array (FPGA), or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a System on a Chip (SOC).

In some embodiments, processing circuitry QQ170 may include one or more of Radio Frequency (RF) transceiver circuitry QQ172 and baseband processing circuitry QQ174. In some embodiments, RF transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, RAM, ROM, mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signaling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 14 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, WD refers to a device capable, configured, arranged and/or operable to communicate wirelessly with network nodes and/or other wireless devices. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless cameras, a gaming console or device, a music storage device, a playback appliance, a wearable terminal device, a wireless endpoint, a mobile station, a tablet, a laptop, a Laptop Embedded Equipment (LEE), a Laptop Mounted Equipment (LME), a smart device, a wireless Customer Premise Equipment (CPE), a vehicle-mounted wireless terminal device, etc.. A WD may support Device-to-Device (D2D) communication, for example by implementing a 3GPP standard for sidelink communication, Vehicle-to-Vehicle (V2V), Vehicle-to-Infrastructure (V21), Vehicle-to-Everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a M2M device, which may in a 3GPP context be referred to as an MTC device. As one particular example, the WD may be a UE implementing the 3GPP NB-IoT standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, NB-loT, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, CPU, DSP, ASIC, FPGA, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a Universal Serial Bus (USB) port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 15:
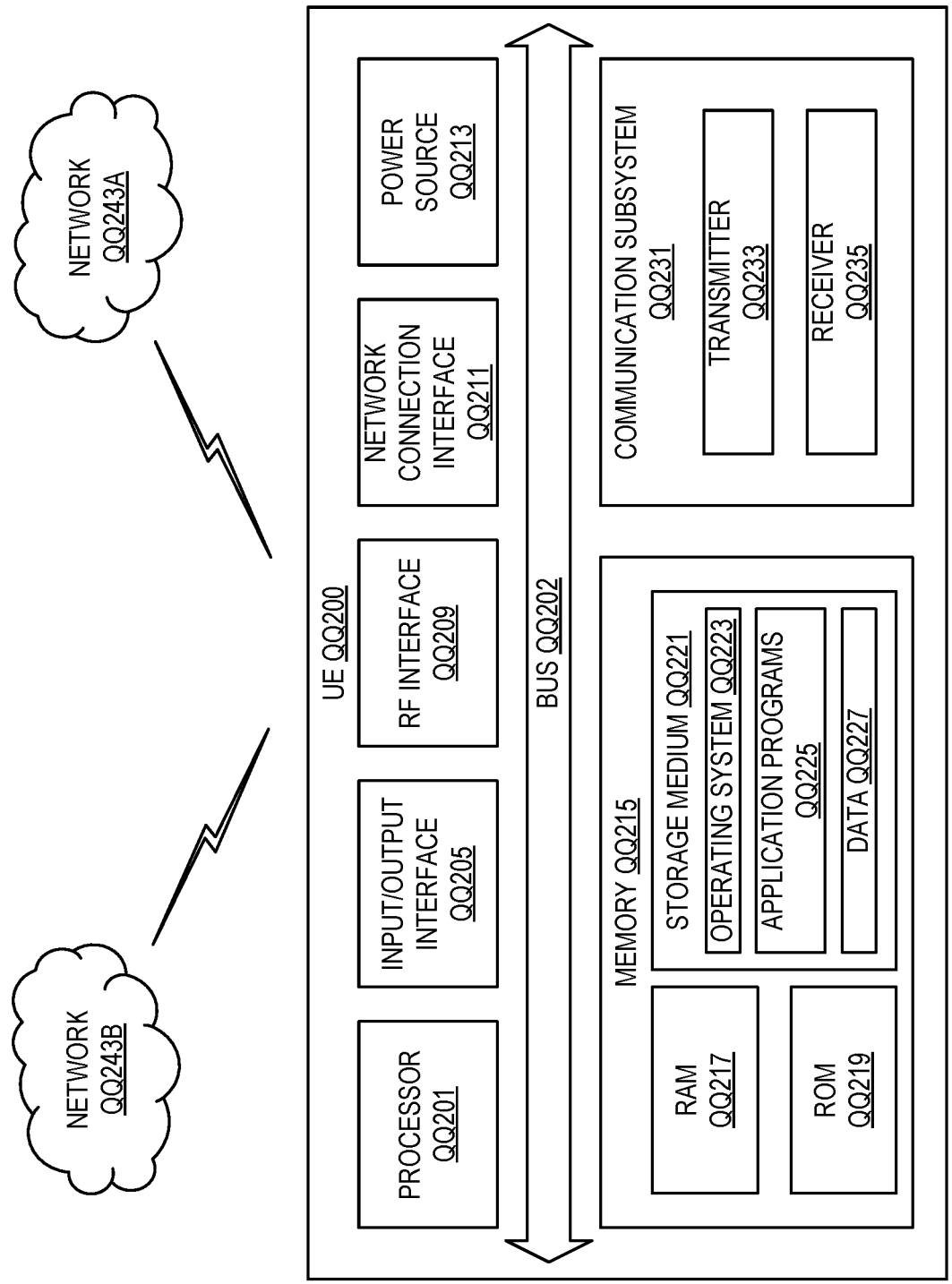
FIG. 15 illustrates one embodiment of a UE according to some embodiments disclosed herein.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the Third Generation Partnership Project (3GPP), including a NB-IoT UE, a MTC UE, and/or an enhanced MTC (eMTC) UE. UE QQ200, as illustrated in FIG. 15, is one example of a WD configured for communication in accordance with one or more communication standards promulgated by the 3GPP, such as 3GPP's GSM, UMTS, LTE, and/or 5G standards. As mentioned previously, the terms WD and UE may be used interchangeable. Accordingly, although FIG. 15 is a UE, the components discussed herein are equally applicable to a WD, and vice-versa.

In FIG. 15, UE QQ200 includes processing circuitry QQ201 that is operatively coupled to input/output interface QQ205, RF interface QQ209, network connection interface QQ211, memory QQ215 including RAM QQ217, ROM QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or DSP, together with appropriate software; or any combination of the above. For example, the processing circuitry QQ201 may include two CPUs. Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a LAN, a WAN, a computer network, a wireless network, a telecommunications network, another like network or any combination thereof. For example, network QQ243a may comprise a WiFi network. Network connection interface QQ211 may be configured to include a receiver and a transmitter interface used to communicate with one or more other devices over a communication network according to one or more communication protocols, such as Ethernet, Transmission Control Protocol (TCP)/IP, Synchronous Optical Networking(SONET), Asynchronous Transfer Mode (ATM), or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as Redundant Array of Independent Disks (RAID), floppy disk drive, flash memory, USB flash drive, external hard disk drive, thumb drive, pen drive, key drive, High Density Digital Versatile Disc (HD-DVD) optical disc drive, internal hard disk drive, Blu-Ray optical disc drive, Holographic Digital Data Storage (HDDS) optical disc drive, external mini-Dual In-line Memory Module (DIMM), Synchronous Dynamic RAM (SDRAM), external micro-DIMM SDRAM, smartcard memory such as a Subscriber Identity Module (SIM) or a Removable User Identity Module (RUIM), other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 15, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a RAN according to one or more communication protocols, such as IEEE 802.11, Code Division Multiple Access (CDMA), WCDMA, GSM, LTE, Universal Terrestrial Radio Access Network (UTRAN), WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the Global Positioning System (GPS) to determine a location, another like communication function, or any combination thereof. For example, communication subsystem QQ231 may include cellular communication, WiFi communication, Bluetooth communication, and GPS communication. Network QQ243b may encompass wired and/or wireless networks such as a LAN, a WAN, a computer network, a wireless network, a telecommunications network, another like network or any combination thereof. For example, network QQ243b may be a cellular network, a WiFi network, and/or a near-field network. Power source QQ213 may be configured to provide Alternating Current (AC) or Direct Current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 16:
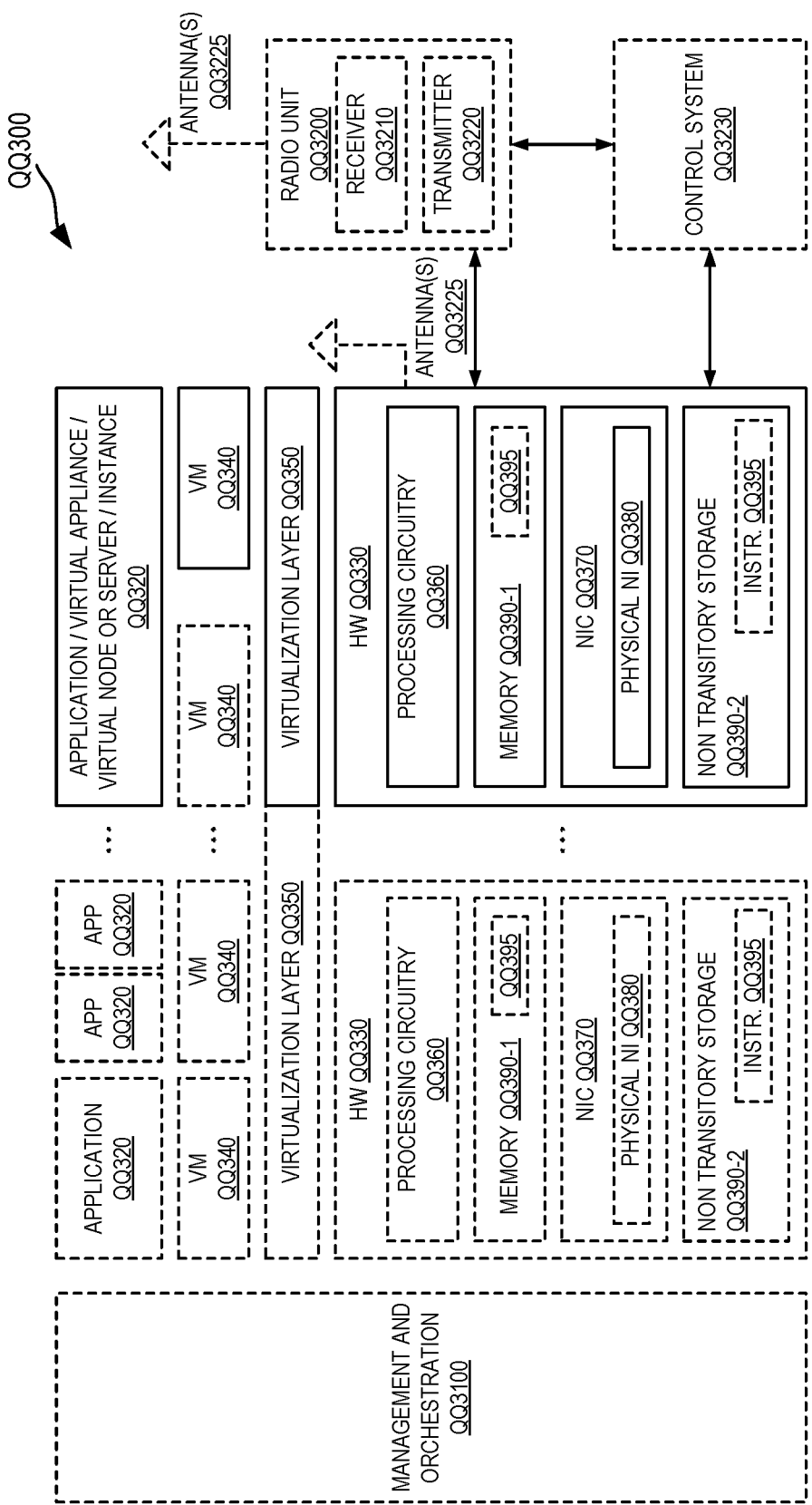
FIG. 16 is a schematic block diagram illustrating a virtualization environment in which functions implemented by some embodiments may be virtualized.

FIG. 16 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated ASICs, or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more Network Interface Controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a Virtual Machine Monitor (VMM). Virtualization layer QQ350 may present a virtual operating platform that appears like networking hardware to virtual machine QQ340.

As shown in FIG. 16, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or CPE) where many hardware nodes work together and are managed via Management and Orchestration (MANO) QQ3100, which, among others, oversees lifecycle management of applications QQ320.

Virtualization of the hardware is in some contexts referred to as Network Function Virtualization (NFV). NFV may be used to consolidate many network equipment types onto industry standard high volume server hardware, physical switches, and physical storage, which can be located in data centers, and CPE.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate Virtual Network Elements (VNEs).

Still in the context of NFV, Virtual Network Function (VNF) is responsible for handling specific network functions that run in one or more virtual machines QQ340 on top of hardware networking infrastructure QQ330 and corresponds to application QQ320 in FIG. 16.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signaling can be effected with the use of control system QQ3230 which may alternatively be used for communication between the hardware nodes QQ330 and radio units QQ3200.

Figure 17:
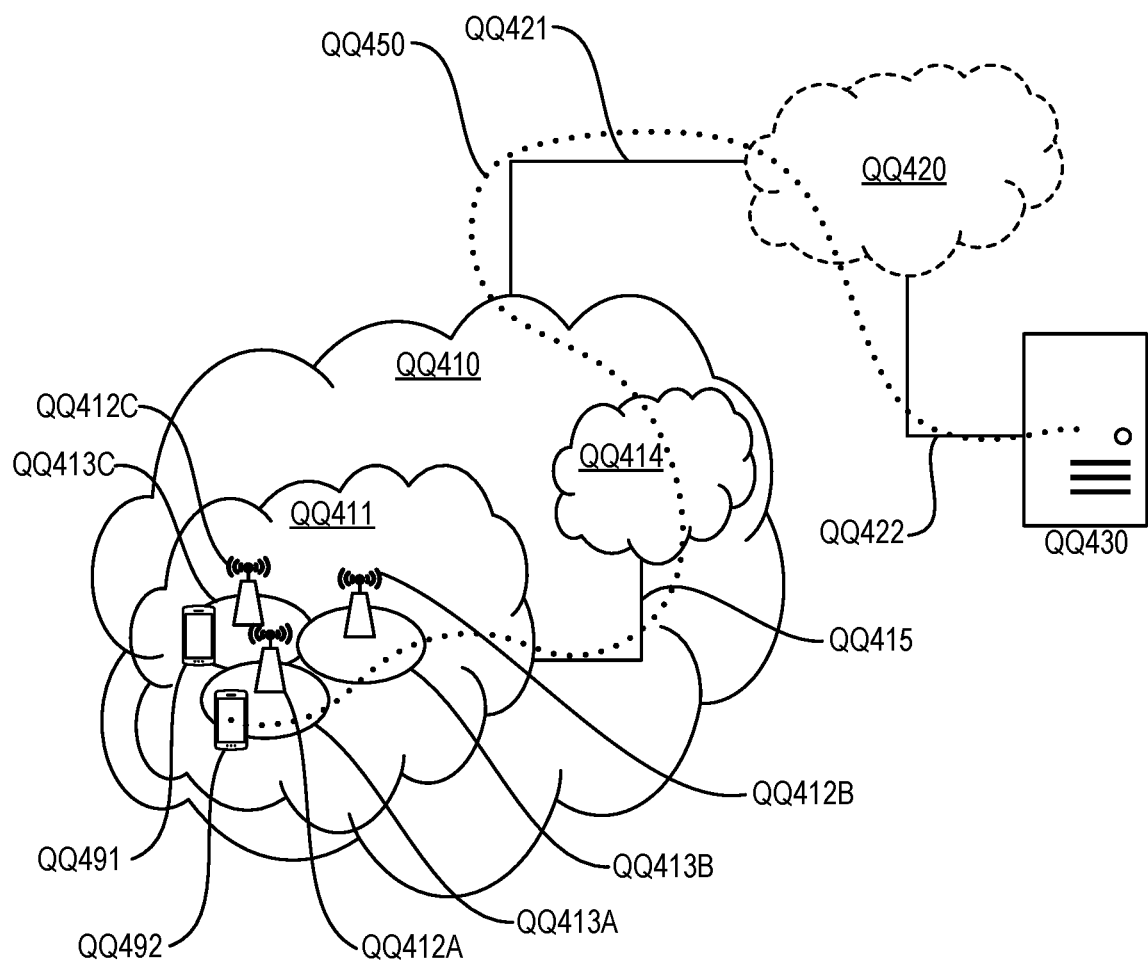
FIG. 17 illustrates a communication system including a telecommunication network according to some embodiments disclosed herein.

FIG. 17 illustrates a telecommunication network connected via an intermediate network to a host computer in accordance with some embodiments. In particular, with reference to FIG. 17, in accordance with an embodiment, a communication system includes telecommunication network QQ410, such as a 3GPP-type cellular network, which comprises access network QQ411, such as a RAN, and core network QQ414. Access network QQ411 comprises a plurality of base stations QQ412a, QQ412b, QQ412c, such as Node Bs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server, or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 17 as a whole enables connectivity between the connected UEs QQ491, QQ492 and host computer QQ430. The connectivity may be described as an Over-the-Top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 18:
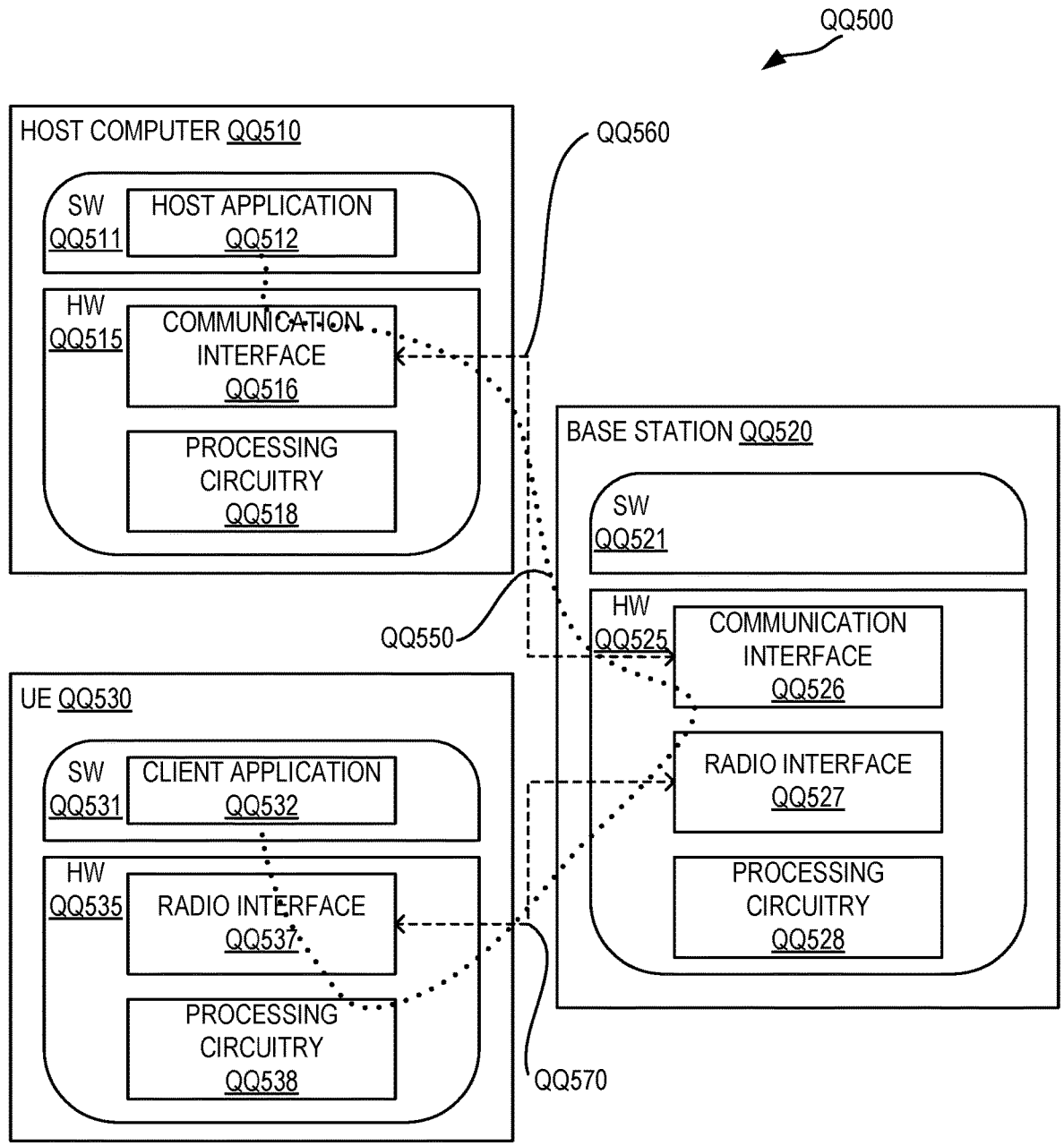
FIG. 18 illustrates a communication system according to some embodiments disclosed herein.

Example implementations, in accordance with an embodiment, of the UE, base station and host computer discussed in the preceding paragraphs will now be described with reference to FIG. 18. FIG. 18 illustrates host computer communicating via a base station with a user equipment over a partially wireless connection in accordance with some embodiments. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 18) served by base station QQ520.

Communication interface QQ526 may be configured to facilitate connection QQ560 to host computer QQ510. Connection QQ560 may be direct or it may pass through a core network (not shown in FIG. 18) of the telecommunication system and/or through one or more intermediate networks outside the telecommunication system. In the embodiment shown, hardware QQ525 of base station QQ520 further includes processing circuitry QQ528, which may comprise one or more programmable processors, ASICs, FPGAs, or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, ASICs, FPGAs, or combinations of these (not shown) adapted to execute instructions. UE QQ530 further comprises software QQ531, which is stored in or accessible by UE QQ530 and executable by processing circuitry QQ538. Software QQ531 includes P74682-US3 client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 18 may be similar or identical to host computer QQ430, one of base stations QQ412a, QQ412b, QQ412c and one of UEs QQ491, QQ492 of FIG. 17, respectively. This is to say, the inner workings of these entities may be as shown in FIG. 18 and independently, the surrounding network topology may be that of FIG. 17.

In FIG. 18, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve security and/or reduce network complexity over alternatives.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in P74682-US3 software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. Additional information may also be found in the document(s) provided in the Appendices.

Some example embodiments disclosed herein include:

Group A Embodiments

Embodiment 1: A method of Radio Resource Control (RRC) signaling, performed by a wireless device, the method comprising:

transmitting an RRC Resume Request to a base station; and receiving an RRC Suspend message from the base station in response to the transmitting.

Embodiment 2: The method of embodiment 1, further comprising storing one or more parameters comprised in the RRC Suspend message, the parameters comprising one or more of:

Access Stratum (AS) security context information;

an Inactive Radio Network Temporary Identifier (I-RNTI);

a nextHopChainingCount (NCC);

a Radio Access Network (RAN) paging configuration (ran-PagingCycle); or a RAN Notification Area Configuration (ran-NotificationAreaInfo).

Embodiment 3: The method of embodiment 2, wherein storing the parameters comprises replacing previously-stored AS security context information with the AS security context information in the RRC Suspend message.

Embodiment 4: The method of any of embodiments 2-3, wherein storing the one or more parameters comprises replacing a previously-stored NCC with the NCC in the RRC Suspend message.

Embodiment 5: The method of any of embodiments 2-4, wherein storing the one or more parameters comprises replacing a previously-stored ran-PagingCycle with the ran-PagingCycle in the RRC Suspend message.

Embodiment 6: The method of any of embodiments 2-5, wherein storing the one or more parameters comprises replacing a previously-stored ran-NotificationAreaInfo with the ran-NotificationAreInfo in the RRC Suspend message.

Embodiment 7: The method of any of embodiments 2-6, further comprising receiving an instruction from the base station to store the one or more parameters comprised in the RRC Suspend message.

Embodiment 8: The method of any of the preceding embodiments, further comprising updating one or more location-based parameters responsive to receiving the RRC Suspend message.

Embodiment 9: The method of embodiment 8, wherein the location-based parameters comprise a Physical Cell Identity (PCI), a Cell Identity (Cell ID), and/or a Cell Radio Network Temporary Identifier (C-RNTI).

Embodiment 10: The method of embodiment 9, further comprising obtaining the PCI by detecting a synchronization signal associated with a cell served by the base station.

Embodiment 11: The method of any of embodiments 9-10, further comprising obtaining the cell ID from system information received from the base station and associated with a cell served by the base station.

Embodiment 12: The method of any of embodiments 9-11, further comprising performing random access to a cell served by the base station to obtain the C-RNTI.

Embodiment 13: The method of embodiment 12, wherein transmitting the RRC Resume Request is in response to obtaining the C-RNTI.

Embodiment 14: The method of any of embodiments 8-13, further comprising receiving an instruction from the base station to perform the updating.

Embodiment 15: The method of any of the preceding embodiments, wherein receiving the RRC Suspend message comprises receiving an RRC Release message comprising an indication to suspend.

Embodiment AA: The method of any of the previous embodiments, further comprising:
providing user data; and
forwarding the user data to a host computer via the transmission to the base station.

Group B Embodiments

Embodiment 16: A method of Radio Resource Control (RRC) signaling, performed by a base station, the method comprising:
receiving an RRC Resume Request from a wireless device; and
transmitting an RRC Suspend message to the wireless device in response to the receiving.

Embodiment 17: The method of embodiment 16, wherein transmitting the RRC Suspend message comprises transmitting an RRC Release message comprising an indication to suspend.

Embodiment 18: The method of any of embodiments 16-17, wherein the RRC Suspend message comprises one or more parameters, the parameters comprising one or more of:
Access Stratum (AS) security context information;
an Inactive Radio Network Temporary Identifier (I-RNTI);
a nextHopChainingCount (NCC);
a Radio Access Network (RAN) paging configuration (ran-PagingCycle); or
a RAN Notification Area Configuration (ran-NotificationAreaInfo).

Embodiment 19: The method of any of embodiments 17-18, further comprising transmitting, to the wireless device, an instruction to store the one or more parameters comprised in the RRC Suspend message.

Embodiment 20: The method of any of embodiments 16-19, further comprising transmitting, to the wireless device and in response to receiving the RRC Resume Request, an instruction to update one or more location-based parameters.

Embodiment 21: The method of embodiment 20, wherein the location-based parameters comprise a Physical Cell Identity (PCI), a Cell Identity (Cell ID), and/or a Cell Radio Network Temporary Identifier (C-RNTI).

Embodiment 22: The method of embodiment 21, further comprising transmitting a synchronization signal comprising the PCI and associated with a cell served by the base station.

Embodiment 23: The method of any of embodiments 21-22, further comprising transmitting system information associated with a cell served by the base station and comprising the cell ID.

Embodiment BB: The method of any of the previous embodiments, further comprising:
obtaining user data; and
forwarding the user data to a host computer or a wireless device.

Group C Embodiments

Embodiment C1: A wireless device configured to perform any of the steps of any of the Group A embodiments.

Embodiment C2: A wireless device comprising:
processing circuitry configured to perform any of the steps of any of the Group A embodiments; and
power supply circuitry configured to supply power to the wireless device.

Embodiment C3: A wireless device comprising processing circuitry and memory, the memory containing instructions executable by the processing circuitry whereby the wireless device is configured to perform any of the steps of any of the Group A embodiments.

Embodiment C4: A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Embodiment C5: A computer program comprising instructions which, when executed by at least one processor of a wireless device, causes the wireless device to carry out the steps of any of the Group A embodiments.

Embodiment C6: A carrier containing the computer program of embodiment C5, wherein the carrier is one of an electronic signal, optical signal, radio signal, or computer readable storage medium.

Embodiment C7: A base station configured to perform any of the steps of any of the Group B embodiments.

Embodiment C8: A base station comprising:
processing circuitry configured to perform any of the steps of any of the Group B embodiments;

power supply circuitry configured to supply power to the base station.

Embodiment C9: A base station comprising processing circuitry and memory, the memory containing instructions executable by the processing circuitry whereby the base station is configured to perform any of the steps of any of the Group B embodiments.

Embodiment C10: A computer program comprising instructions which, when executed by at least one processor of a base station, causes the base station to carry out the steps of any of the Group B embodiments.

Embodiment C11: A carrier containing the computer program of embodiment C10, wherein the carrier is one of an electronic signal, optical signal, radio signal, or computer readable storage medium.

Group D Embodiments

Embodiment D1: A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of any of the Group B embodiments.

Embodiment D2: The communication system of the pervious embodiment further including the base station.

Embodiment D3: The communication system of the previous 2 embodiments, further including the UE, wherein the UE is configured to communicate with the base station.

Embodiment D4: The communication system of the previous 3 embodiments, wherein:
  the processing circuitry of the host computer is configured to execute a host application, thereby providing the user data; and
  the UE comprises processing circuitry configured to execute a client application associated with the host application.

Embodiment D5: A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps of any of the Group B embodiments.

Embodiment D6: The method of the previous embodiment, further comprising, at the base station, transmitting the user data.

Embodiment D7: The method of the previous 2 embodiments, wherein the user data is provided at the host computer by executing a host application, the method further comprising, at the UE, executing a client application associated with the host application.

Embodiment D8: A user equipment (UE) configured to communicate with a base station, the UE comprising a radio interface and processing circuitry configured to perform any of the previous 3 embodiments.

Embodiment D9: A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's components configured to perform any of the steps of any of the Group A embodiments.

Embodiment D10: The communication system of the previous embodiment, wherein the cellular network further includes a base station configured to communicate with the UE.

Embodiment D11: The communication system of the previous 2 embodiments, wherein:
  the processing circuitry of the host computer is configured to execute a host application, thereby providing the user data; and
  the UE's processing circuitry is configured to execute a client application associated with the host application.

Embodiment D12: A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the UE performs any of the steps of any of the Group A embodiments.

Embodiment D13: The method of the previous embodiment, further comprising at the UE, receiving the user data from the base station.

Embodiment D14: A communication system including a host computer comprising:
  communication interface configured to receive user data originating from a transmission from a user equipment (UE) to a base station,
  wherein the UE comprises a radio interface and processing circuitry, the UE's processing circuitry configured to perform any of the steps of any of the Group A embodiments.

Embodiment D15: The communication system of the previous embodiment, further including the UE.

Embodiment 16: The communication system of the previous 2 embodiments, further including the base station, wherein the base station comprises a radio interface configured to communicate with the UE and a communication interface configured to forward to the host computer the user data carried by a transmission from the UE to the base station.

Embodiment D17: The communication system of the previous 3 embodiments, wherein:
  the processing circuitry of the host computer is configured to execute a host application; and
  the UE's processing circuitry is configured to execute a client application associated with the host application, thereby providing the user data.

Embodiment D18: The communication system of the previous 4 embodiments, wherein:
  the processing circuitry of the host computer is configured to execute a host application, thereby providing request data; and
  the UE's processing circuitry is configured to execute a client application associated with the host application, thereby providing the user data in response to the request data.

Embodiment D19: A method implemented in a communication system including a host computer, a base station and a user equipment (UE), the method comprising:
 at the host computer, receiving user data transmitted to the base station from the UE, wherein the UE performs any of the steps of any of the Group A embodiments.

Embodiment D20: The method of the previous embodiment, further comprising, at the UE, providing the user data to the base station.

Embodiment D21: The method of the previous 2 embodiments, further comprising:
 at the UE, executing a client application, thereby providing the user data to be transmitted; and
 at the host computer, executing a host application associated with the client application.

Embodiment D22: The method of the previous 3 embodiments, further comprising:
 at the UE, executing a client application; and
 at the UE, receiving input data to the client application, the input data being provided at the host computer by executing a host application associated with the client application,
 wherein the user data to be transmitted is provided by the client application in response to the input data.

Embodiment D23: A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

Embodiment D24: The communication system of the previous embodiment further including the base station.

Embodiment D25: The communication system of the previous 2 embodiments, further including the UE, wherein the UE is configured to communicate with the base station.

Embodiment D26: The communication system of the previous 3 embodiments, wherein:
 the processing circuitry of the host computer is configured to execute a host application;
 the UE is configured to execute a client application associated with the host application, thereby providing the user data to be received by the host computer.

Embodiment D27: A method implemented in a communication system including a host computer, a base station and a user equipment (UE), the method comprising:
 at the host computer, receiving, from the base station, user data originating from a transmission which the base station has received from the UE, wherein the UE performs any of the steps of any of the Group A embodiments.

Embodiment D28: The method of the previous embodiment, further comprising at the base station, receiving the user data from the UE.

Embodiment D29: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
5G-S-TMSI Fifth Generation System Architecture Evolution Temporary Mobile Subscriber Identity
AC Alternating Current
ACK Acknowledgement
AP Access Point
AS Access Stratum
ASIC Application Specific Integrated Circuit
ATM Asynchronous Transfer Mode
BS Base Station
BSC Base Station Controller
BTS Base Transceiver Station
CA Carrier Aggregation
CD Compact Disk
CDMA Code Division Multiple Access
CN Core Network
COTS Commercial Off-the-Shelf
CPE Customer Premise Equipment
CPU Central Processing Unit
CRC Cyclic Redundancy Check
C-RNTI Cell Radio Network Temporary Identifier
CSI Channel State Information
D2D Device-to-Device
DAS Distributed Antenna System
DC Dual Connectivity
DCI Downlink Control Information
DFT Discrete Fourier Transform
DIMM Dual In-line Memory Module
DL Downlink
DRX Discontinuous Reception
DSP Digital Signal Processor
DVD Digital Video Disk
EEPROM Electrically Erasable Programmable Read Only Memory
eMTC Enhanced Machine Type Communication
eNB Evolved Node B
EPROM Erasable Programmable Read Only Memory
E-SMLC Evolved Serving Mobile Location Center
E-UTRAN Evolved Universal Mobile Telecommunications Service Terrestrial Radio Access Network
FPGA Field Programmable Gate Array
GHz Gigahertz
gNB Fifth Generation Node B
GPS Global Positioning System
GSM Global System for Mobile Communications
HARQ Hybrid Automatic Repeat Request
HDDS Holographic Digital Data Storage
HD-DVD High Density Digital Versatile Disc
ID Identity
I/O Input and Output
IoT Internet of Things
IP Internet Protocol
I-RNTI Inactive Radio Network Temporary Identifier
kHz Kilohertz
LAN Local Area Network
LEE Laptop Embedded Equipment
LME Laptop Mounted Equipment
LTE Long Term Evolution
M2M Machine-to-Machine
MAC-I Message Authentication Code for Integrity
MANO Management and Orchestration
MCE Multi-Cell/Multicast Coordination Entity
MCG Master Cell Group
MDT Minimization of Drive Tests
MIMO Multiple Input Multiple Output
MME Mobility Management Entity ms Millisecond
MSC Mobile Switching Center
MSR Multi-Standard Radio
MTC Machine Type Communication
NACK Negative Acknowledgement
NAS Non-Access Stratum
NB-IoT Narrowband Internet of Things
NCC nextHopChainingCount
NFV Network Function Virtualization
NG Next Generation
NIC Network Interface Controller
NR New Radio
O&M Operation and Maintenance
OFDM Orthogonal Frequency Division Multiplexing
OSS Operations Support System
OTT Over-the-Top
PBCH Physical Broadcast Channel
PCell Primary Cell
PCI Physical Cell Identity
PDA Personal Digital Assistant
PDCCH Physical Downlink Control Channel
PDCP Packet Data Convergence Protocol
PDSCH Physical Downlink Shared Channel
PLMN Public Land Mobile Network
PRB Physical Resource Block
PROM Programmable Read Only Memory
PSTN Public Switched Telephone Network
PUCCH Physical Uplink Control Channel
PUSCH Physical Uplink Shared Channel
QoS Quality of Service
RAID Redundant Array of Independent Disks
RAM Random Access Memory
RAN Radio Access Network
RAT Radio Access Technology
RB Resource Block
RF Radio Frequency
RNC Radio Network Controller
ROHC Robust Header Compression
ROM Read Only Memory
RRC Radio Resource Control
RRH Remote Radio Head
RRM Radio Resource Management
RRU Remote Radio Unit
RUIM Removable User Identity Module
SAE System Architecture Evolution
SCell Secondary Cell
SCG Secondary Cell Group
SDRAM Synchronous Dynamic Random Access Memory
SIM Subscriber Identity Module
SOC System on a Chip
SON Self-Organizing Network
SONET Synchronous Optical Networking
SpCell Special Cell
SPS Semi-Persistent Scheduling
SS Synchronization Signal
TCP Transmission Control Protocol
TMSI Temporary Mobile Subscriber Identity
UCI Uplink Control Information
UE User Equipment
UL Uplink
UMTS Universal Mobile Telecommunications Service
USB Universal Serial Bus
UTRAN Universal Terrestrial Radio Access Network
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed:

1. A method in a User Equipment, UE, comprising:
transmitting a Radio Resource Control, RRC, resume request message;
in response to the RRC resume request message, receiving an RRC connection release message with an indication for suspend; and
in response to receiving the RRC connection release message with an indication for suspend, replacing information in a stored Access Stratum, AS, context of the UE with new information, wherein replacing the information in the stored AS context of the UE comprises:
replacing stored security context information with security context information comprised in the RRC connection release message;
replacing a stored Inactive Radio Network Temporary Identifier, I-RNTI, with an I-RNTI comprised in the RRC connection release message;
replacing a stored cell identity with a cell identity of a cell in which the UE sent the RRC resume request message and received the RRC connection release message;
replacing a stored physical cell identity with a physical cell identity of the cell in which the UE sent the RRC resume request message and received the RRC connection release message; or
replacing a stored Cell Radio Network Temporary Identifier, C-RNTI, with a C-RNTI obtained by the UE for the cell in which the UE sent the RRC resume request message and received the RRC connection release message.

2. The method of claim 1, wherein replacing the information in the stored AS context of the UE comprises replacing a stored cell identity with a cell identity of a cell in which the UE sent the RRC resume request message and received the RRC connection release message, replacing a stored physical cell identity with a physical cell identity of the cell in which the UE sent the RRC resume request message and received the RRC connection release message, and replacing a stored Cell Radio Network Temporary Identifier, C-RNTI, with a C-RNTI obtained by the UE for the cell in which the UE sent the RRC resume request message and received the RRC connection release message.

3. The method of claim 1, wherein replacing the information in the stored AS context of the UE comprises replacing stored security context information with security context information comprised in the RRC connection release message, and wherein the security context information comprises a next hop chaining count.

4. The method of claim 1, wherein replacing the information in the stored AS context of the UE comprises replacing a stored Inactive Radio Network Temporary Identifier, I-RNTI, with an I-RNTI comprised in the RRC connection release message.

5. The method of claim 1, wherein replacing the information in the stored AS context of the UE comprises replacing a stored Cell Radio Network Temporary Identifier, C-RNTI, with a C-RNTI obtained by the UE for the cell in which the UE sent the RRC resume request message and received the RRC connection release message.

6. The method of claim 1, wherein replacing the information in the stored AS context of the UE comprises replacing a stored cell identity with a cell identity of a cell in which the UE sent the RRC resume request message and received the RRC connection release message.

7. The method of claim 1, wherein the C-RNTI obtained by the UE for the cell in which the UE sent the RRC resume request message and received the RRC connection release message is a temporary C-RNTI.

8. The method of claim 1 further comprising, after replacing the information in the stored AS context of the UE to provide an updated AS context of the UE, using the updated AS context of the UE to send a subsequent RRC resume request.

9. The method of claim 8 wherein using the updated AS context of the UE to send the subsequent RRC resume request comprises using the updated AS context to calculate a security integrity token comprised in the subsequent RRC resume request.

10. A User Equipment, UE, comprising:
a radio interface; and
processing circuitry associated with the radio interface, wherein the processing circuitry is configured to cause the UE to:
transmit a Radio Resource Control, RRC, resume request message;
in response to the RRC resume request message, receive an RRC connection release message with an indication for suspend; and
in response to receiving the RRC connection release message with an indication for suspend, replace information in a stored Access Stratum, AS, context of the UE with new information wherein, to replace the information in the stored AS context of the UE, the processing circuitry is configured to cause the UE to:
replace stored security context information with security context information comprised in the RRC connection release message;
replace a stored Inactive Radio Network Temporary Identifier, I-RNTI, with an I-RNTI comprised in the RRC connection release message;
replace a stored cell identity with a cell identity of a cell in which the UE sent the RRC resume request message and received the RRC connection release message;
replace a stored physical cell identity with a physical cell identity of the cell in which the UE sent the RRC resume request message and received the RRC connection release message; or
replace a stored Cell Radio Network Temporary Identifier, C-RNTI, with a C-RNTI obtained by the UE for the cell in which the UE sent the RRC resume request message and received the RRC connection release message.

11. The UE of claim 10, wherein replacing the information in the stored AS context of the UE comprises replacing a stored cell identity with a cell identity of a cell in which the UE sent the RRC resume request message and received the RRC connection release message, replacing a stored physical cell identity with a physical cell identity of the cell in which the UE sent the RRC resume request message and received the RRC connection release message, and replacing a stored Cell Radio Network Temporary Identifier, C-RNTI, with a C-RNTI obtained by the UE for the cell in which the UE sent the RRC resume request message and received the RRC connection release message.

12. The UE of claim 10, wherein replacing the information in the stored AS context of the UE comprises replacing stored security context information with security context information comprised in the RRC connection release message, and wherein the security context information comprises a next hop chaining count.

13. The UE of claim 10, wherein replacing the information in the stored AS context of the UE comprises replacing a stored Inactive Radio Network Temporary Identifier, I-RNTI, with an I-RNTI comprised in the RRC connection release message.

14. The UE of claim 10, wherein replacing the information in the stored AS context of the UE comprises replacing a stored Cell Radio Network Temporary Identifier, C-RNTI, with a C-RNTI obtained by the UE for the cell in which the UE sent the RRC resume request message and received the RRC connection release message.

15. The UE of claim 10, wherein replacing the information in the stored AS context of the UE comprises replacing a stored cell identity with a cell identity of a cell in which the UE sent the RRC resume request message and received the RRC connection release message.

16. A network node for updating a User Equipment, UE, Access Stratum, AS, context stored for a UE upon re-suspending the UE in response to a Radio Resource Control, RRC, resume request from the UE, the network node comprising:
processing circuitry configured to cause the network node to:
receive, from a UE, a RRC resume request message;
in response to receiving the RRC resume request message, transmit, to the UE, an RRC connection release message with an indication for suspend; and
in response to transmitting the RRC connection release message with an indication for suspend, replace information in a stored AS context of the UE with new information, wherein, to replace the information in the stored AS context of the UE, the processing circuitry is configured to cause the network node to:
replace stored security context information with security context information comprised in the RRC connection release message;
replace a stored Inactive Radio Network Temporary Identifier, I-RNTI, with an I-RNTI comprised in the RRC connection release message;
replace a stored cell identity with a cell identity of a cell in which the UE sent the RRC resume request message and received the RRC connection release message;
replace a stored physical cell identity with a physical cell identity of the cell in which the UE sent the RRC resume request message and received the RRC connection release message; or
replace a stored Cell Radio Network Temporary Identifier, C-RNTI, with a C-RNTI obtained by the UE for the cell in which the UE sent the RRC resume request message and received the RRC connection release message.

17. The network node of claim 16, wherein replacing the information in the stored AS context of the UE comprises replacing a stored cell identity with a cell identity of a cell in which the UE sent the RRC resume request message and received the RRC connection release message, replacing a stored physical cell identity with a physical cell identity of the cell in which the UE sent the RRC resume request message and received the RRC connection release message, and replacing a stored Cell Radio Network Temporary Identifier, C-RNTI, with a C-RNTI obtained by the UE for the cell in which the UE sent the RRC resume request message and received the RRC connection release message.

18. The network node of claim 16, wherein replacing the information in the stored AS context of the UE comprises replacing stored security context information with security context information comprised in the RRC connection release message, and wherein the security context information comprises a next hop chaining count.

19. The network node of claim 16, wherein replacing the information in the stored AS context of the UE comprises replacing a stored Inactive Radio Network Temporary Identifier, I-RNTI, with an I-RNTI comprised in the RRC connection release message.

20. The network node of claim 16, wherein replacing the information in the stored AS context of the UE comprises replacing a stored Cell Radio Network Temporary Identifier, C-RNTI, with a C-RNTI obtained by the UE for the cell in which the UE sent the RRC resume request message and received the RRC connection release message.

* * * * *